(12) United States Patent
Glidden et al.

(10) Patent No.: US 11,675,753 B2
(45) Date of Patent: Jun. 13, 2023

(54) DATA CLEANSING SYSTEM AND METHOD

(71) Applicant: Introhive Services Inc., Fredericton (CA)

(72) Inventors: Jody Glidden, Miami Beach, FL (US); Michael Waugh, Hanwell (CA); Martyn Sibbald, Fredericton (CA); David James Hudson, Fredericton (CA); Peter McGaw, Fredericton (CA); Jacob O'Reilly, Frdericton (CA); Colin Goertzen, Lake George (CA)

(73) Assignee: Introhive Services Inc., Fredericton (CA)

( * ) Notice: Subject to any disclaimer, the term of this patent is extended or adjusted under 35 U.S.C. 154(b) by 184 days.

(21) Appl. No.: 16/938,683

(22) Filed: Jul. 24, 2020

(65) Prior Publication Data
US 2021/0026821 A1    Jan. 28, 2021

Related U.S. Application Data

(60) Provisional application No. 62/879,071, filed on Jul. 26, 2019, provisional application No. 62/879,057, filed on Jul. 26, 2019, provisional application No. 62/892,901, filed on Aug. 28, 2019, provisional application No. 62/902,588, filed on Sep. 19, 2019.

(51) Int. Cl.
| | |
|---|---|
| *G06F 16/00* | (2019.01) |
| *G06F 16/215* | (2019.01) |
| *G06F 16/23* | (2019.01) |
| *G06Q 10/10* | (2023.01) |

(Continued)

(52) U.S. Cl.
CPC ........ *G06F 16/215* (2019.01); *G06F 16/2379* (2019.01); *G06F 21/6245* (2013.01); *G06Q 10/10* (2013.01); *H04L 63/02* (2013.01)

(58) Field of Classification Search
CPC ...... G06F 16/686; G06F 16/638; G06F 16/61; G06F 16/685; G06F 40/279; G06F 16/635; G06F 40/16; G06F 40/30; G06F 40/289; G06F 16/65; G06F 40/295; G10L 15/22; G10L 15/1815; G10L 15/26; G10L 15/30;
(Continued)

(56) References Cited

U.S. PATENT DOCUMENTS

| | | | |
|---|---|---|---|
| 8,311,874 B2 | 11/2012 | Gupta et al. | |
| 9,633,057 B2 | 4/2017 | Glidden | |

(Continued)

OTHER PUBLICATIONS

Next Generation of Interactive contact centre for efficient customer recognition: Conceptual Framework M Saberi, E Chang, OK Hussain, Z Saberi (Year: 2016).*

(Continued)

*Primary Examiner* — Yicun Wu
(74) *Attorney, Agent, or Firm* — David J. Greer; Ridout & Maybee LLP

(57) ABSTRACT

System and method for updating customer data that includes a plurality of electronically stored contact records that each include contact information for a respective individual contact. Filtering is applied to the customer data to identify contacts that fall within defined filtering criteria. Information about the identified contacts is provided to a decision making authority for a further layer of filtering. Customer data is updated based on feedback derived from the decision making authority.

18 Claims, 21 Drawing Sheets

(51) Int. Cl.
*H04L 9/40* (2022.01)
*G06F 21/62* (2013.01)

(58) Field of Classification Search
CPC .............. H04M 3/5191; H04M 3/5175; G06Q 10/0633; G06Q 30/016; G06Q 10/107
See application file for complete search history.

(56) References Cited

U.S. PATENT DOCUMENTS

| | | |
|---|---|---|
| 2002/0049626 A1 | 4/2002 | Mathias et al. |
| 2005/0065980 A1 | 3/2005 | Hyatt |
| 2005/0125463 A1 | 6/2005 | Joshi et al. |
| 2005/0131762 A1 | 6/2005 | Bharat et al. |
| 2006/0101060 A1* | 5/2006 | Li ..................... G06F 16/90335 707/E17.02 |
| 2007/0129977 A1 | 6/2007 | Forney |
| 2007/0130170 A1 | 6/2007 | Forney |
| 2007/0130182 A1 | 6/2007 | Forney |
| 2009/0276296 A1 | 11/2009 | Spriegel |
| 2009/0299830 A1 | 12/2009 | West et al. |
| 2009/0313075 A1 | 12/2009 | O'Sullivan et al. |
| 2010/0005085 A1 | 1/2010 | Millmore |
| 2010/0121684 A1 | 5/2010 | Morio et al. |
| 2010/0332290 A1* | 12/2010 | Narvaez ................. G06Q 30/02 705/7.39 |
| 2011/0161835 A1 | 6/2011 | Karam |
| 2011/0196716 A1 | 8/2011 | Srinivasan et al. |
| 2011/0207484 A1 | 8/2011 | Holal et al. |
| 2011/0270763 A1 | 11/2011 | Graham, III |
| 2011/0276356 A1 | 11/2011 | Smith et al. |
| 2011/0289106 A1 | 11/2011 | Rankin et al. |
| 2012/0095837 A1 | 4/2012 | Bharat |
| 2012/0203584 A1 | 8/2012 | Mishor et al. |
| 2012/0253924 A1 | 10/2012 | Giese et al. |
| 2013/0054306 A1 | 2/2013 | Bhalla |
| 2013/0124259 A1 | 5/2013 | Chourey et al. |
| 2013/0166358 A1 | 6/2013 | Parmar |
| 2013/0218883 A1 | 8/2013 | McConnell et al. |
| 2014/0136613 A1 | 5/2014 | Chandar |
| 2014/0143018 A1 | 5/2014 | Nies |
| 2014/0173078 A1 | 6/2014 | McCord |
| 2014/0214943 A1 | 7/2014 | Shapero et al. |
| 2014/0278620 A1 | 9/2014 | Khan et al. |
| 2014/0358946 A1 | 12/2014 | Glidden et al. |
| 2015/0006297 A1 | 1/2015 | Stark |
| 2015/0026075 A1 | 1/2015 | Mondri et al. |
| 2015/0205842 A1 | 7/2015 | Jain et al. |
| 2015/0248403 A1 | 9/2015 | PaZdziora et al. |
| 2016/0034904 A1 | 2/2016 | Arroyo et al. |
| 2016/0232540 A1 | 8/2016 | Gao |
| 2016/0247163 A1 | 8/2016 | Donsky |
| 2016/0255082 A1 | 9/2016 | Rathod |
| 2016/0284012 A1 | 9/2016 | Hom et al. |
| 2016/0358065 A1 | 12/2016 | Gedge et al. |
| 2017/0124595 A1 | 5/2017 | Costache |
| 2017/0213178 A1 | 7/2017 | Todd |
| 2017/0221072 A1 | 8/2017 | AthuluruTlrumala et al. |
| 2017/0236081 A1 | 8/2017 | Smith |
| 2017/0270099 A1 | 9/2017 | Gomy |
| 2017/0329770 A1 | 11/2017 | Kozak |
| 2017/0372254 A1 | 12/2017 | Vainas et al. |
| 2018/0097836 A1 | 4/2018 | Stolarz et al. |
| 2018/0101771 A1 | 4/2018 | Schwarm et al. |
| 2018/0246886 A1 | 8/2018 | Dragomirescu |
| 2018/0293550 A1 | 10/2018 | Liang et al. |
| 2019/0074987 A1 | 3/2019 | Wiener et al. |
| 2019/0095507 A1 | 3/2019 | Elisseeff et al. |
| 2019/0140995 A1 | 5/2019 | Roller et al. |
| 2019/0251593 A1 | 8/2019 | Allouche |
| 2019/0324655 A1 | 10/2019 | Nguyen et al. |
| 2019/0361879 A1 | 11/2019 | Rogynskyy et al. |
| 2020/0065768 A1 | 2/2020 | Fuller |
| 2021/0042800 A1 | 2/2021 | Chandra et al. |

OTHER PUBLICATIONS

Eggert, A. et al. "Value creation in the relationship life cycle: A quasi-longitudinal analysis" Industrial Marketing Management. 35 2006.

Jap, S. et al. "Testing a Life-Cycle Theory of Cooperative Interorganizational Relationships: Movement Across Stages and Performance" Management Science. 53 2007.

Anonymous "Method And Apparatus To Perform Automated Data Migration Between Heterogeneous Data Sources" 2009.

Martens et al. "A Data Decomposition Method for Stepwise Migration of Complex Legacy Data" 2018.

Aggour, K. et al. "Mining company networks for marketing insights and sales leads", In Proceedings of the 2013 IEEE/ACM International Conference on Advances in Social Networks Analysis and Mining (ASONAM '13) 2013.

* cited by examiner

CONTACT INTERACTION DATA 310

EMAIL COMMUNICATIONS CONTACT INTERACTION DATA

| Contact Identifier | Type | Time Stamp | Member Identifier |
|---|---|---|---|
| rthompson@northwindtraders.com | Sender | Jul 3, 2019; 10:15:08 | John Smith (ID 5643) |
| haley.welch@myers.com | Recipient | Jul 3, 2019; 14:11:10 | Jane Slacks (ID 5654) |
| chan_emily@stellar.biz | CC Recipient | Jul 3, 2019; 14:11:10 | John Smith (ID 5643) |
| . | . | . | . |
| . | . | . | . |

MEETING CONTACT INTERACTION DATA

| Contact Identifier | Type | Time Stamp | Member Identifier |
|---|---|---|---|
| lwright@citypower.com | organizer | Jul 3, 2019; 13:10:08 | George Jones (ID 5678) |
| jsmith@newco.com | invitee | Jul 3, 2019; 13:15:45 | Hank Long (ID 5678) |
| . | . | . | . |
| . | . | . | . |

VOIP CONTACT INTERACTION DATA

| Contact Identifier | Type | Time Stamp | Member Identifier |
|---|---|---|---|
| 618-678-4321 | outgoing | Jul 3, 2019; 11:14:24 | Jennifer Hawk (ID 5690) |
| 819-690-1234 | incoming | Jul 3, 2019; 12:12:45 | Coco Rich (ID 5743) |

FIG. 3

| CRM ID | Contact Name | Contact Title | Contact Department | Contact Location |
|---|---|---|---|---|
| 1 | Fred Johnson | Regional Manager | Sales | Fredericton |
| 2 | Fred Johnson | Senior Manager | Sales | Saint John |
| 3 | Fred Johnson | Associate Manager | Marketing | Moncton |
| 4 | Fred Johnston | Senior Manager | Engineering | Toronto |
| 5 | Fred Johnson | Executive Manager | Sales | Halifax |

FIG. 13A

| Title | Title Score |
|---|---|
| Executive Manager | 40 |
| Regional Manager | 32 |
| Senior Manager | 30 |
| Junior Manager | 20 |
| Associate Manager | 18 |
| Assistant Manager | 16 |

FIG. 13B

| Department | Department Score |
|---|---|
| Finance | 40 |
| Sales | 33 |
| Marketing | 30 |
| Customer Support | 20 |
| QA | 15 |
| Engineering | 10 |

FIG. 13C

| Location | Distance |
|---|---|
| Fredericton | 0 |
| Saint John | 89 |
| Moncton | 144 |
| Halifax | 282 |
| Miami, USA | 2544 |
| London, UK | 4761 |

+Merge
Contacts (14)
Processed
Skipped

| NAME | TITLE | ACCOUNT | RELATIONSHIP |
|---|---|---|---|
| ☐ Johnson, Fred | Regional Manager | Northwind Traders | *** |
| ☐ Thompson, Jay | Director of Marketing | Northwind Traders | ***** |
| ☐ Welch, Haley | Partner | Myers LLP | *** |
| ☐ Chan, Emily | General Counsel | Steller Mobile | *** |
| ☐ Wright, Lori | Vice President | City Power | ** |
| ☐ ☐ ☐ | . . | . . | . . |

Step 4: Review

First Name: Fred
Last Name: Johnson
Title: Senior Manager
Account: Northwind Traders
E-mail: fjohnson@northwindtraders.com
Work Phone: 506-454-9876
Mobile Phone: 506-647-3671
Social Media: _____
City: Fredericton
State/Province: New Brunswick
Country: Canada

[ Merge ] — 576

FIG. 20

DATA CLEANSING SYSTEM AND METHOD

RELATED APPLICATIONS

This application claims the benefit of and priority to the following applications, the contents of which are incorporated herein by reference: (1) United Stated Provisional Patent Application No. 62/879,057 filed Jul. 26, 2019, entitled "SYSTEM AND METHOD FOR DETECTING AND ARCHIVING OBSOLETE CLIENT DATA IN A CUSTOMER RELATIONSHIP MANAGEMENT", (2) United Stated Provisional Patent Application No. 62/879,071 filed Jul. 26, 2019, entitled "SYSTEM AND METHOD FOR DETERMINING NEW CONTACTS FOR A CUSTOMER RELATIONSHIP MANAGEMENT (CRM)", (3) United Stated Provisional Patent Application No. 62/892,901 filed Aug. 28, 2019, entitled "SYSTEM AND METHOD FOR DETECTING AND ARCHIVING OBSOLETE CLIENT DATA IN A CUSTOMER RELATIONSHIP MANAGEMENT", and (4) United Stated Provisional Patent Application No. 62/902,588 filed Sep. 19, 2019, entitled "SYSTEM AND METHOD FOR ANALYZING DATA POINTS TO IDENTIFY INDIVIDUALS".

FIELD

The present disclosure relates to methods and systems for processing and updating digital information that supports a customer relationship management (CRM) system.

BACKGROUND

Enterprises such as companies, accounting firms, law firms, universities, partnerships, agencies and governments commonly use CRM systems and related technology to manage relationships and interactions with other parties such as customers and potential customers. In particular, CRM systems typically employ electronic computing and communications devices that enable one or more of contact management, sales management and calendar management with the objective of enhancing productivity. An important function provided by CRM systems is digital tracking and storage of data about third parties such as customers and potential customers.

It can be time consuming and cumbersome to properly maintain and update the data that is stored in a CRM system. For example, adding new data such as new contacts to a CRM system requires a recognition that new data is available and a determination that the new data is worth adding to the CRM system. Traditional approaches have relied on the individuals interacting with a new contact to recognize the new contacts and add contact information for the new contact to the CRM system. However, such reliance on individuals can often result in useful contact data not being captured. Attempts to reduce reliance on individuals by automating capture of such data, on the other hand, can result in over-capture of irrelevant information.

A further challenge faced by CRM systems is archiving obsolete or stale data from the CRM system. Currently this requires an authorized individual to log into the CRM system and perform manual searches to determine which data requires to be archived and then archive that data. In addition to requiring extensive human CRM-system interaction, the authorized person will typically not be familiar with every contact in the CRM. This is problematic as one contact may have a sparse interaction history and not be a valuable contact whereas another client who also has a sparse interaction history is a valuable contact.

A further challenge faced by CRM systems is ensuring that government privacy standards (for example, but not limited to, the EU General Data Protection Regulation—GDPR) and industry acceptable privacy expectations are met. This may require enterprise to periodically delete specific contact data or justify why it is retaining such data. Companies and other entities are creating privacy policies to help define which data may be retained, for what reason and for how long. These Policies can be subjective as they can differ from Company to Company based on the type of contact data and the use of the contact Data at each Company.

The amount of data in a CRM system can be difficult to manage for appropriate privacy retention periods as the policies are not typically just date based but are also based on the type and use of the data.

A further challenge faced by CRM systems is detecting and merging duplicate contact entries, as well as preventing the creation of duplicate contact entries. Often a contact can be added to a CRM by more than one person, with each person having a slightly different information about the contact. For example, one person may enter an individual contact into a CRM without complete information, and a subsequent person may attempt to enter the same individual as a contact without complete information and/or different but slight changes in the contact information (e.g., variations in title, location, department), resulting in two unique contact records and CRM IDs for the same individual. The addition of duplicate but different contact entries for the same individual reduces overall efficiency and accuracy of the CRM system. Correcting the duplicate entries can be difficult to detect and process.

Accordingly, there is also a need for systems and methods that can enable efficient cleansing of CRM data. By way of example, there is a need for systems and methods that may perform one or more of the following: enable efficient capture of new contact data; efficient detection and archiving of inactive, low value contacts; enable efficient compliance with privacy policies; and/or enable efficient and accurate detection and merging of duplicate contact data.

The foregoing examples of the related art and limitations thereto are intended to be illustrative and not exclusive. Other limitations of the related art will become apparent to those of skill in the art upon a reading of the specification and a study of the drawing.

SUMMARY

According to a first example aspect is a computer implemented method for updating customer data that includes a plurality of electronically stored contact records that each include contact information for a respective individual contact, comprising: applying automated filtering to the customer data to identify one or more contacts that fall within defined filtering criteria; providing information about the one or more identified contacts to a decision making authority for additional filtering; and receiving feedback derived from the decision making authority in respect of the provided information, and based on the feedback, automatically updating the customer data.

According to a further example embodiment is a computer system for updating customer data that includes a plurality of electronically stored contact records that each include contact information for a respective individual contact, the computer system comprising: a processor; a non-volatile storage coupled to the processer and including software instructions that when executed by the processor configure the computer system to: apply automated filtering to the customer data to identify one or more contacts that fall within defined filtering criteria; provide information about the one or more identified contacts to a decision making authority for additional filtering; and receive feedback derived from the decision making authority in respect of the provided information, and based on the feedback, automatically update the customer data.

BRIEF DESCRIPTION OF THE DRAWINGS

Reference will now be made, by way of example, to the accompanying drawings which show example embodiments of the present application, and in which:

FIG. 3 is a table illustrating contact interaction data that is collected by the connector of the CRM support agent according to example embodiments;

FIG. 13A illustrates examples of similar contact entries in a CRM system that may be duplicates.

FIG. 13B to 13D show examples of quantizing contact data attributes to enable similarity comparisons, according to example embodiments.

FIGS. 17, 18, 19 and 20 present user interface display examples generated by the data steward module to support detection and processing of duplicate contact data, according to an example embodiment.

Similar reference numerals may have been used in different figures to denote similar components.

DESCRIPTION OF EXAMPLE EMBODIMENTS

The following embodiments and aspects thereof are described and illustrated in conjunction with systems, tools and methods which are meant to be exemplary and illustrative, not limiting in scope.

Embodiments will now be described more fully hereinafter with reference to the accompanying drawings, in which some, but not all, embodiments of the invention are shown. The features and aspects presented in this disclosure may be embodied in many different forms and should not be construed as limited to the embodiments set forth herein. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

System Overview

Figure 1:
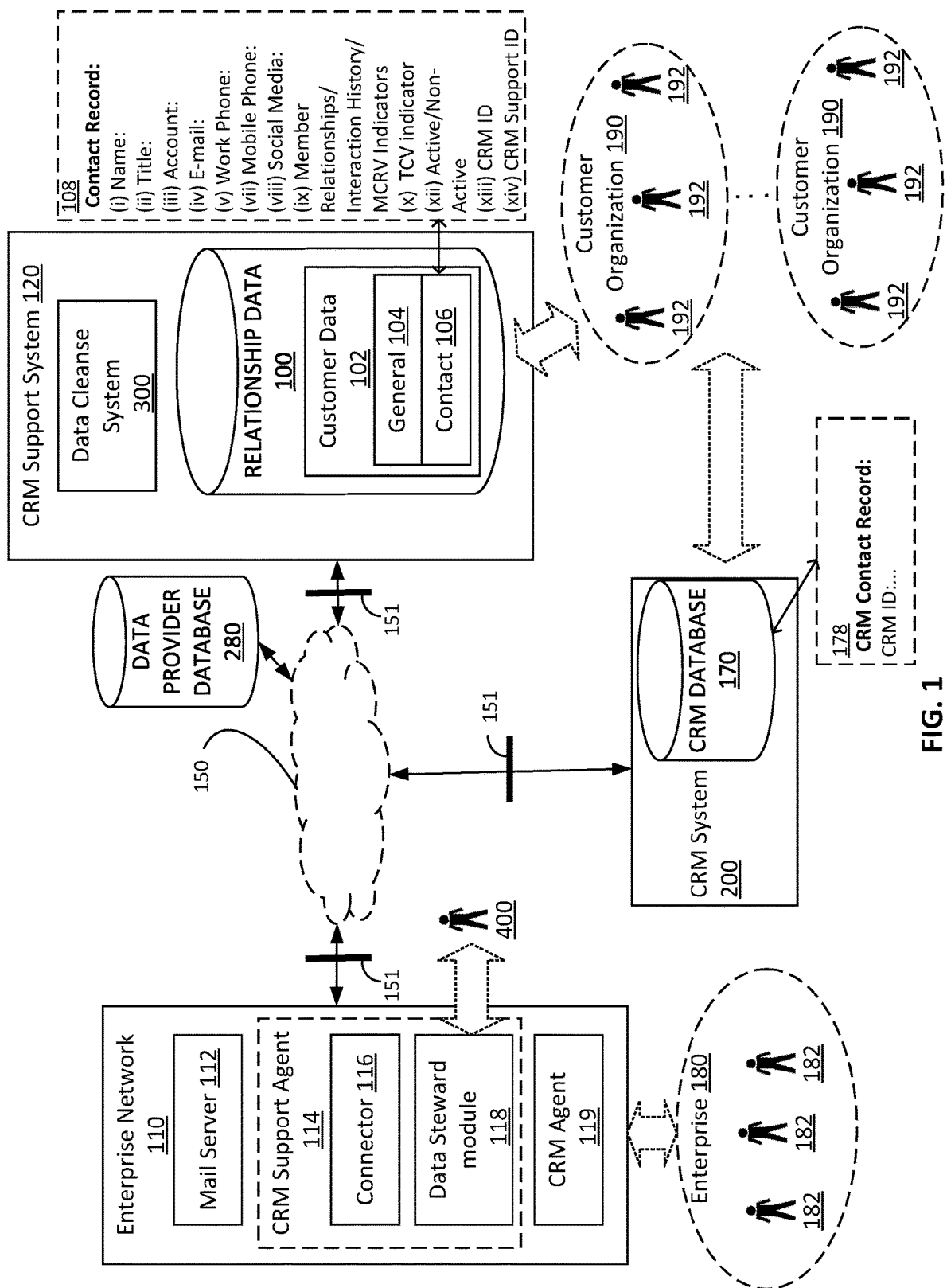
FIG. 1 is a simplified block diagram illustrating an environment that includes a client network, CRM support system and CRM system in accordance with an example embodiment of the present disclosure.

FIG. 1 illustrates an example environment in which the methods and systems described in this disclosure may be implemented. In the example of FIG. 1, environment includes an enterprise network 110 that supports an enterprise such as a company, firm or other type of organization (referred to in this disclosure as "enterprise 180"). In example embodiments, a plurality of individuals are registered or otherwise associated with the enterprise network 110 as members 182 of the enterprise 180. These individual members 182 may for example be employees, owners, partners, consultants, volunteers, and interns of the enterprise 180. In some examples, enterprise 180 could have as few as 1 member 182, and in some examples, enterprise 180 may have thousands or more members 182.

The enterprise 180 tracks information in respect of one or more external entities of interest to the enterprise 180, referred to in this disclosure as "customer organizations" 190. For example, such external entities could be existing or potential customers, clients or donors or other entities of interest to the enterprise, and may include, among other things, companies, partnerships, universities, firms, government entities, joint venture groups, non-government organizations, charities and other types of groups. Typically, each customer organization 190 will have a set of individual contacts, referred to in this disclosure as "contacts" 192. For example, the individual contacts 192 associated with a customer organization 190 may be employees, owners, partners, consultants, volunteers, and interns of the customer organization 190.

Enterprise network 110 may, for example, include a plurality of computer devices, servers and systems that are associated with the enterprise 180 and are linked to each other through one or more internal or external communication networks, at least some of which may implement one or more virtual private networks (VPN).

In example embodiments, the environment of FIG. 1 also includes a CRM support system 120 and a CRM system 200, each of which may also include one or more computer devices, servers and systems. One or both of CRM support system 120 and CRM system 200 may, in some examples, be operated by third party organizations that are service providers to the enterprise 180 associated with enterprise network 110. CRM support system 120 and a CRM system 200 are configured to track customer data on behalf of enterprise 180.

In the illustrated example, enterprise network 110, CRM support system 120, and CRM system 200 are each connected to a common communication network 150. Communication network 150 may for example include the Intranet, one or more enterprise intranets, wireless wide area networks, wireless local area networks, wired networks and/or other digital data exchange networks. Respective firewalls 151 may be located between the communication network 150 and each of the enterprise network 110, CRM support system 120, and CRM system 200. In different example embodiments, one or more of the features or functions of CRM support system 120 and CRM system 200 that are described herein could be alternatively be implemented in a common system or implemented within the enterprise network 110.

In example embodiments, CRM system 200 may be implemented using a known CRM solution such as, but not limited to, Salesforce.com™, Microsoft Dynamics™, InterAction™ or Maximizer™, and includes a CRM database 170 that includes customer data (e.g., CRM data) for customer organizations 190 that the enterprise 180 is desirous of tracking. The CRM data that is stored in a CRM database 170 for a customer organization 190 may for example include: (I) general customer data such as: account name (e.g., name of the customer organization 190), type of organization and legal jurisdiction, physical address(es), phone number(s), social network information, domain name(s), web page address(es), account number(s), size of organization, industrial classification; and (II) individual contact data that includes contact information for individual active contacts 192 who are members of the customer organization 190. In example embodiments, such individual contact data could for example be arranged as respective CRM contact records 178 for each contact 192. The CRM contact record 178 for each contact 192 may for example include: CRM contact identifier ("CRM ID"), individual name, title, email address(es), physical address(es), phone number(s), social network information, and identification of individual members 182 within the enterprise 180 who have existing relationships (e.g., are active contacts) with the individual active contact 192.

In example embodiments, CRM support system 120 is configured to provide enhanced CRM information and functionality that supplements CRM System 200. CRM support system 120 includes a relationship data storage 100 for storing relationship data generated in respect of the customer organizations 190 of interest to enterprise 180. In example embodiments, similar to CRM database 170, relationship data storage 100 may store, in respect of each customer organization 190, customer data 102 that includes: (I) general customer data 104 and (II) individual contact data 106 for individual contacts 192 within the customer organization 190. In example embodiments, the general customer data 104 stored at relationship data storage 100 may include at least some of the same data types as the general customer data stored at CRM database 170, such as: account name, type of organization and legal jurisdiction, physical address(es), phone number(s), social network information, domain name(s), web page address(es), account number(s), size of organization, industrial classification. Additionally, general customer data 104 stored at relationship data storage 100 may include information such as: (1) business and transactional data including past sales data, accounts receivable data, pending order data, dunning records, credit reports; (2) descriptive data for the customer organization 190 (e.g., entity's lines of business, years of existence, corporate history); and (3) relationship value data for the customer organization 190, such as an "account relationship value" (ARV) indicator that is a measure of the overall enterprise-customer organization relationship (described in greater detail below).

The individual contact data 106 stored at relationship data storage 100 includes at least some of the same data as the individual contact data stored in CRM contact records 178 at CRM database 170 for each contact 192 within the customer organization 190, as well as supplemental information. Similar to contact data stored at CRM system 200, individual contact may also be represented by respective contact records 108 in customer data storage 100. As illustrated in the example contact record 108 shown in FIG. 1, the contact information for an individual contact 192 could include, among other things, at least some of the following data fields:

(i) name (e.g., first, last, middle if known);
(ii) title (e.g., position in customer organization;
(iii) account identifier (e.g., name and or other identifier of customer organization 190 that the contact 192 is associated with);
(iv) email address(es);
(v) landline work phone number(s);
(vi) mobile phone/text number (s);
(viii) social media page link(s);
(ix) relationship data that may include: (a) identification of any members 182 within the enterprise 180 who have existing relationships with the contact 192 (referred to in this disclosure as member-contact relationships), (b) member-contact relationship value (MCRV) indicators representing a perceived strength of each of these member-contact relationships, (c) a communication interaction history for each member-contact relationship 182, and (d) a communication interaction history for general communications between the enterprise 180 and the contact 192 (e.g., general promotional emails);
(x) a total contact value (TCV) indicator that represents a perceived overall value of the contact 192 in the context of the relationship between the enterprise 180 and the customer organization 190;
(xii) an active/non-active indicator indicating of the contact 192 is a active contact (described below);
(Xiii) a CRM ID that maps to the same contact 192 in the CRM system 200 (if the contact 192 has been registered in the CRM system 200); and (xiv) a CRM support ID that is a unique identifier assigned to the contact 192 for the CRM support system 120 (may be omitted in some examples with in favour of only using the CRM ID).

Referring to the "active/non-active indicator", in example embodiments, the contacts 192 included in the individual contact data 106 can be classified as "active contacts" or "non-active contacts". In at least some examples, non-active contacts 192 that are included in the individual contact data 106 are not included as active contacts 192 in CRM database 170. For example, contact data 106 may include contact information about individual contacts 192 who have been identified by the CRM support system 120 as being members of the customer organization 190 but have been classified as non-active as they have not met a threshold criteria to be identified as active contacts 192 in the CRM database 170. This could include for example new contacts 192 that are judged of interest but not yet of sufficient value to be included as active contacts 192 in CRM database 170, or contacts 192 that have been archived as non-active due to a lack of interaction for an extended time period.

Accordingly, in example embodiments, contact data 106 stored in relationship data storage 100 includes information for a plurality of contacts 192. For example, the information for a contact 192 may be stored as a respective multi-field contact record. In example embodiments the contact record for a contact 192 includes an indicator (e.g. one or more flags) that indicates if the contact is "active" or "non-active".

In some cases, non-active contacts 192 included in contact data 106 may also be flagged with a "never add" indicator so that they are intentionally excluded from becoming active contacts in contact data 106 or CRM database 170.

In the example described above, in addition to supplemental relationship information (e.g., fields (ix) to (xii) in contact record 108), contact records 108 also include a number of data fields that overlap with information included in the corresponding CRM database CRM contact records 178 (e.g. fields (i) to (viii) in some possible configurations. In particular, in a typical implementation, relationship data storage 100 may include substantially all the data about a customer organization 190 as is stored in CRM database, as well as additional data that the CRM support system 120 derives by processing the data included in CRM database, information received from enterprise network 110, and information obtained from data provide databases 280.

In some alternative examples, the information stored in respect of contacts 192 may be split between the CRM support system 120 and the CRM database 170 to minimize or avoid overlap. For example, in alternative embodiments, items (i) to (viii) described above in respect of contact record 108 may instead be omitted from relationship data storage contact record 108 and only be stored in a respective CRM contact record 178 in CRM database 170. One or both of the CRM ID and CRM Support ID may be used to associate the records 108, 178 for the same contact 192.

In some examples, the CRM support system 120 is configured to periodically refresh (e.g., for example on a timed cycle such an once every 24 hours) customer organization data 102 so that the general customer organization data 104 and customer organization individual contact data 106 maintained in relationship data storage 100 always includes current or near-current information. The CRM support system 120 may periodically refresh the information stored in relationship data storage 100 based on information from a plurality of sources. For example, CRM support system 120 may obtain data from the CRM database 170 of CRM system 200, from enterprise network 110, from one or more third party data provider database(s) 280, as well as from other data sources that are available through communication network 150. In some examples, CRM support system 120 is configured to instruct CRM system 200 to make corresponding updates to the contact data stored in CRM database 170.

Enterprise network 110 includes at least one mail server 112 for handling and delivering external email that enterprise network 110 exchanges with remote mail servers through communication network 150. Thus, mail server 112 contains emails sent/received by the enterprise associated with enterprise network 110. In some examples, mail server 112 may also handle internal emails that are internal within enterprise network 110.

In example embodiments, enterprise network 110 includes a CRM agent 119 that provides the enterprise network 110 with an interface to CRM system 200.

In example embodiments, enterprise network 110 also includes a CRM support agent 114 that provides the enterprise network 110 with an interface to CRM support system 120. In example embodiments, CRM support agent 114 includes a mail connector 116 and a data steward module 118. As described in greater detail below, mail connector 116 is configured to connect to and retrieve emails from the mail server 112, and data steward module 118 is configured to enable a decision making authority (e.g., data steward 400) to receive information from and provide instructions to a data cleanse system 300 that can be hosted by the CRM support system 120.

In at least some example embodiments, communications between CRM support system 120 and CRM system 200 are facilitated through the CRM support agent 114 and CRM agent 119 of the enterprise network 110.

Relationship Strength Data

As noted above, in example embodiments the general customer organization data 104 can include enterprise-customer organization value data for the customer organization 190, and the individual contact data 106 can include contact relationship strength and value data in respect of existing member-contact 192 relationships. In some example embodiments, CRM support system 120 is configured to determine relationship data by applying predetermined functions or models. In this regard, one example of a system and method for determining relationship strength data is disclosed in U.S. Pat. No. 9,633,057, issued Apr. 25, 2017, the contents of which are incorporated herein by reference.

In example embodiments, the contact value for each individual contact 192 within a customer organization 190 is represented as a "Total Contact Value" (TCV) indicator, and is a value that represents a perceived overall value of any relationships that an individual contact 192 has in the enterprise-customer organization relationship. In example embodiments, the organization value for the customer organization 190 can include an "account relationship value" (ARV) indicator that is indicative of the strength of the overall enterprise-customer relationship. In some examples, the ARV indicator for a customer organization 190 is based on a combination of the TCV indicators determined in respect of all of the contacts 192 within the customer organization 190.

In example embodiments, the ARV indicator for each customer organization 190 and the TCV indicators for active contacts 192 within that customer organization 190 are determined and tracked by the CRM support system 120 on an ongoing basis. For example, the CRM support system 120 may periodically determine and update such indicators on a periodic cycle such as every 24 hours. In example embodiments, the TCV indicator for an individual contact 192 may be determined based on combination of all enterprise member-contact relationship value (MCRV) indicators for that contact.

Each MCRV indicator may be a combination of: that contact's position within the customer organization 190, a perceived importance of the contact's customer organization 190, and the relationship and communication history of that contact 192 with the specific member 182 of the enterprise 180 that the MCRV score is being calculated in respect of. By way of non-limiting example, in an example embodiment, the MCRV indicator for a specific member-contact relationship may be determined by CRM support system 120 as follows:

(1) A contact position score is assigned to the contact 192 based on the contact's title within the customer organization. In an example embodiment, the relationship data 100 includes a predefined list of possible titles with respective point values allocated to them (e.g.: President=20 points; Vice President=19 points; Director=17 points; Legal Counsel=15 points, etc.).

(2) An organization importance score is assigned to the contact's customer organization 190, and that organization importance score is associated with the contact 192. In example embodiments, CRM support system 120 may treat organization size as a proxy for perceived importance and use an "organization size score" as the organization importance score based pre-defined size/point allocations (e.g.: organization size of 1500+=10 points; 1000 to 1500=9 points; 750-1000=8 points, etc.).

(3) A member-contact relationship strength ("MCRS") score that quantifies the history of communication interactions of the contact 192 with the member 182 of the enterprise 180. For example, an MCRS score could be a quantitative value based on the interaction history of contact 192 with a specific enterprise member 182, based on features such as, among other things: type of communication (e.g., phone, email, video meeting, in-person meeting); frequency of communication; recentness of communications; length of communication; sentiment of communication, and number of communications. For example, an MCRS score could be quantified as a percentage (e.g., 0 to 100%) by applying a predetermined model to the communication features noted above. The predetermined model may in some example be a deterministic rules-based model, and in other examples may be a trained predictive model.

(4) The contact title score, organization importance score, and MCRS are combined according to a defined function to generate the MCRV indicator for the individual contact 192. The defined function can take different forms in different embodiments. For example, the MCRV indicator could be determined using a rules based deterministic function such as: (contact title score)*(organization importance score)* (MCRS score).

In example embodiments, the TCV indicator for a contact 192 may be a sum of all of the MCRV indicators calculated in respect of that contact 192. In example embodiments, the TCV indicator for a contact 192 could be scaled to within a defined range (e.g., a range of 0 to 5). In some examples, a predictive model could be trained to implement the defined function used to generate the TCV indicator.

The ARV indicator for a customer organization 190 can be based on a combination of all MCRV indicators between all members 182 of the enterprise 180 and all active contacts 192 of the customer organization 190. For example, the ARV indicator could be a sum of all of the MCRV indicators calculated in respect of a customer organization 190, although other defined functions could be used to generate the ARV indicator. In example embodiments, scaling is performed such that the ARV indicator is within a defined range (e.g., a range of 0 to 5). In some examples, a predictive model could be trained to implement the defined function used to generate the ARV indicator.

Data Cleansing

In example embodiments, the CRM support agent 114 and data cleanse system 300 of CRM support system 120 are collectively configured to enable implementation of one or more of the following data cleaning functions: (i) system and method for determining new contacts for a CRM system; (ii) system and method for detecting and archiving obsolete client data in a CRM system; (iii) system and method for detecting and removing client data for privacy policy compliance; and/or (iv) system and method for analyzing data points to identify individuals.

(i) System and Method for Determining New Contacts for a CRM

As noted above, adding new contacts to a CRM system requires a recognition that new data is available and a determination that the new data is worth adding to the CRM system. By way of example, in traditional CRM solutions, when an interaction occurs with a potential new contact in a customer organization and a member of an enterprise, the member (e.g., person) doing the interaction with has to realize that an interaction with a new contact is occurring and then take steps to add that person to the CRM system. The person doing the interaction is often busy (or may be travelling) and may not remember to add the new contact information at a later time. Furthermore, a new contact may be irrelevant to the enterprise and thus not worth adding to the CRM system.

Figure 2:
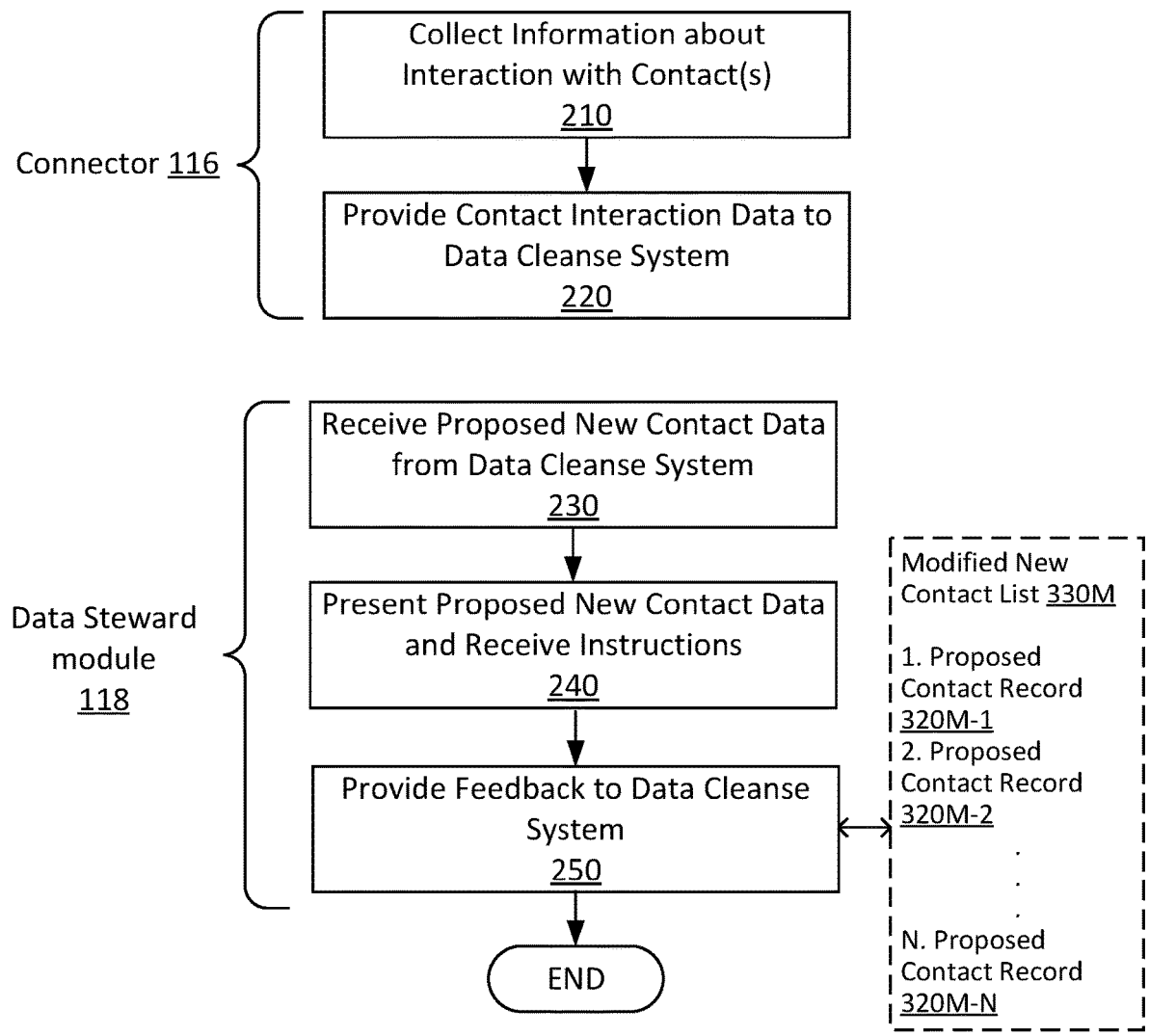
FIG. 2 is a flow chart illustrating operations that can be performed by a connector and data steward module of a CRM support agent included in the client network of FIG. 1, according to example embodiments, to support adding new contact data.
Figure 4:
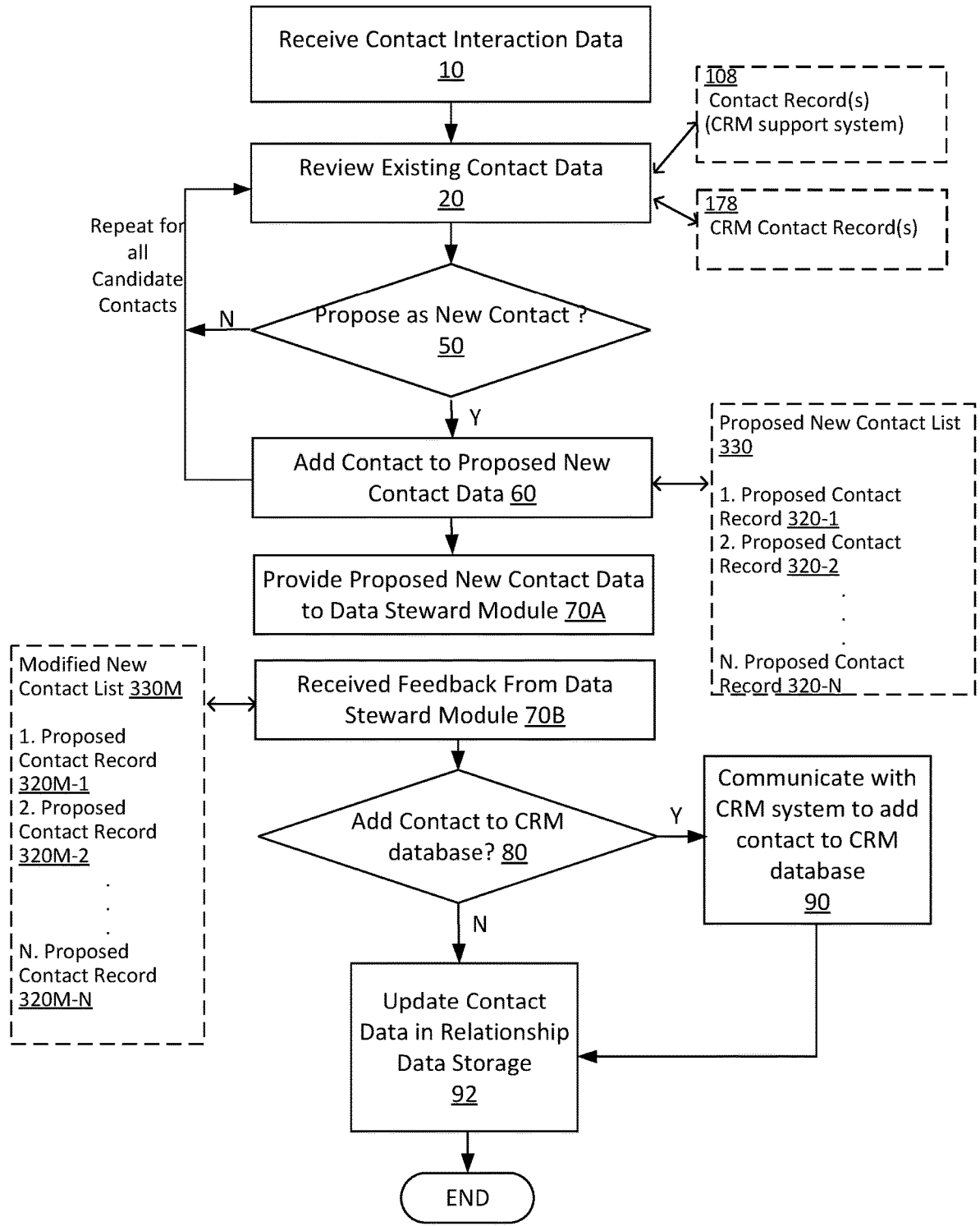
FIG. 4 is a flow chart illustrating processes that can be performed by a data cleanse system included in the CRM support system of FIG. 1, according to example embodiments, to support adding new contact data.

Accordingly, in an example embodiment, CRM support agent 114 and data cleanse system 300 of CRM support System 120 are configured to assist with the detection and addition of new contacts 192 to CRM system 200. In this regard, FIG. 2 is a flow chart illustrating operations that can be performed by the connector 116 and data steward module 118 of CRM support agent 114, and FIG. 4 is a flow chart illustrating operations that can be performed by data cleanse system 300 of CRM support system 120, according to example embodiments. In example embodiments "new" contacts may include both individual contacts that are previously unknown to the CRM support System 120 as well as individual contacts that are known and have an existing contact record 108 that is flagged with a "non-active" indicator.

As indicated in block 210 of FIG. 2, connector 116 is configured to collect information about interactions between users associated with the enterprise network 110 (e.g. members 182 of enterprise 180) and external contacts 192. These interactions may for example be electronic communications such as email, meetings that are tracked in calendar systems and/or scheduled through email communications, and telephone calls that occur through a system that enables call logging. Each of these interactions have associated electronic data that includes a contact identifier (e.g., email address or phone number for contact 192), time stamp information for the interaction, and a member identifier (e.g., data that identifies the member(s) 182 of the enterprise 180 that were involved in the interaction.

In example embodiments, connector 116 is configured to collect the interaction information and generate respective contact interaction data 310 automatically on a scheduled basis (for example every 24 hours). FIG. 3 illustrates a non-limiting example of contact interaction data 310 that may be generated by connector 116 for illustrative purposes.

In some examples, connector 116 may collect interaction information from the mail server 112. For example, in some embodiments connector 116 is configured to intermittently run a batch process to retrieve email messages from the mail server 112 so that contact interaction data 310 can be derived from the email messages and provided through communication network 150 to the data cleanse system 300.

In some examples, the connector 116 runs the batch process at scheduled times, for example every day at a set time (for example 2 AM local time of the mail server 112). In some examples the connector 116 may run the batch process when a threshold amount of email has accumulated since the last batch process was run. In some examples, the connector 116 may run the batch process when instructed to do so by a system administrator, for example upon an initial initialization and configuration. In some examples, connector 116 may operate in a non-batch mode and receive and process emails as they are received by mail server 112.

In example embodiments, the connector 116 is configured to filter email from the mail server 112 such that only selected emails are processed for contact interaction data. In example embodiments, connector 116 performs filtering based on email addresses and is provided with one or both of a blacklist and a whitelist of email addresses. In some example scenarios where connector 116 is provided with a blacklist, the connector 116 does not retrieve emails from the mail server 112 that include email addresses that are included on the blacklist. In some example scenarios where connector 116 is provided with a whitelist, the connector 116 retrieves only emails that include emails addresses on the whitelist. In some example scenarios where connector 116 is provided with both a whitelist and a blacklist, the connector 116 retrieves emails that include addresses that are included exclusively on the whitelist, excluding any addresses that are on the blacklist. In example embodiments, address-based filtering can be done at the domain level, at the username level, based on the full username@domain address, or combinations of the forgoing. Such email address-based filtering can be performed based on one or both of the sender email address and the recipient email address fields. In examples where mail server 112 handles internal email as well as external email, sender and recipient email address-based filtering may be performed to filter out internal emails that are unlikely to include any useful contact data. For example, if the sender email address and recipient email address(es) all have the same domain then an email can be classed as an internal email and skipped.

A further layer of filtering may be based on policies that can be set by an administrator. For example, policy based filtering may be applied based on one or more of: subject field content (e.g., skip emails with blank subject line), email body content (e.g., skip emails that have empty body), and attachment type.

Accordingly, in example embodiments at block 210 the connector 116 retrieves emails from mail server 112. As noted above, the connector 116 may be configured to perform selective filtering when retrieving emails to exclude some emails from further processing. In some examples, the connector 116 is configured to extract selected information from email messages as contact interaction data 310. For each email message, the extracted information may for example include any external email address included in the sender, recipient and carbon copy (CC) and blind carbon copy (BCC) recipient email address fields, along with a send or receive timestamp applied to the email message by the mail server 112. In example embodiments, the extracted information can also include information that identifies any enterprise members 182 that are participating in the email as sender or recipient or CC recipient. In some embodiments, enterprise members 182 are registered with CRM support agent 114, CRM support system 120 and CRM system 200 and thus have an assigned member identifier (e.g. CRM support ID) such as indicated in FIG. 3.

In some example embodiments, the extracted information could include additional information from the email such as contact information embedded in the email body, and in this regard, a data scrapping function such as that described in U.S. patent application Ser. No. 16/907,998 filed Jun. 22, 2020, entitled "System and Method for Identifying and Retrieving Signature Contact Information from an Email or Email Thread", incorporated herein by reference, may be applied to retrieve such information. For example, such a system may also extract additional contact information such as name, title, phone number, social media links, and company name from an email message, for inclusion as part of the contact interaction data 310 (e.g., as "other" data in the example of FIG. 3).

In example embodiments, meeting requests and invites will be included among the email messages that are processed by mail server 112, and connector 116 is configured to include email addresses in the meeting invitee list and organizer fields in the contact interaction data 310 extracted from the emailed meeting invite. In some examples, connector 116 may also be configured to communicate directly with calendar applications of members 182 within the enterprise network 110 to identify email addresses belonging to possible external contacts, and include that information in contact interaction data 310. In some examples where enterprise network 110 supports phone call logging, for example in Voice-Over-Internet-Protocol (VOIP) implementations, connector 116 may be further configured to interact with a VOIP server to collect information about external phone numbers used for outgoing and internal calls for inclusion in contact interaction data 310.

It will thus be appreciated that in example embodiments, connector 116 is configured to automatically interact with components of the enterprise network 110 (e.g. one or more of mail server 112, calendar applications, and/or VOIP servers) to collect contact interaction data 310. For each contact interaction, as illustrated in FIG. 3, the contact interaction data 310 includes one or more external contact identifiers (e.g., email address, phone number, or other contact identifier) and one or more member identifiers that have been extracted from electronic data related to the interaction. In some examples, the contact interaction data 310 in respect of an interaction may also include additional contact information extracted from the electronic information associated with the interaction.

As indicated in block 220, in example embodiments, the contact interaction data 310 collected by connector 116 is sent by the CRM support agent 114 to data cleanse system 300 of the CRM support system 120. In some examples, the contact interaction data 310 includes information for multiple contact interactions and is provided to data cleanse system 300 for batch processing, however in some alternative examples the contact interaction data may be provided to data cleanse system 300 on a contact interaction by contact interaction basis.

Referring now to FIG. 4, as indicated in block 10, in example embodiments, data cleanse system 300 receives contact interaction data 310 from the CRM support agent 114 via communication network 150. Each unique contact (e.g., each "candidate contact") identified by a contact identifier in the contact interaction data 310 is processed as indicated in blocks 20, 50 and 60, as follows.

As indicated in block 20, the data cleanse system 300 is configured to review existing contact data to determine what contact information, if any, can be found within existing contact data in respect of the candidate contact. As noted above, in example embodiments, CRM support system 120 maintains customer data 102 that incudes contact data 106 (including contact records 108) in respect of customer organizations 190. Accordingly, in example embodiments, data cleanse system 300 is configured to retrieve, based on the contact identifier (e.g., email address or phone number) included in the contact interaction data 310, any contact information associated with that contact identifier in the contact data 106. In some examples, data cleanse system 300 may also access CRM database to review CRM contact records 178 for relevant contact information if that information is not already duplicated in relationship data storage 100.

Figure 5:
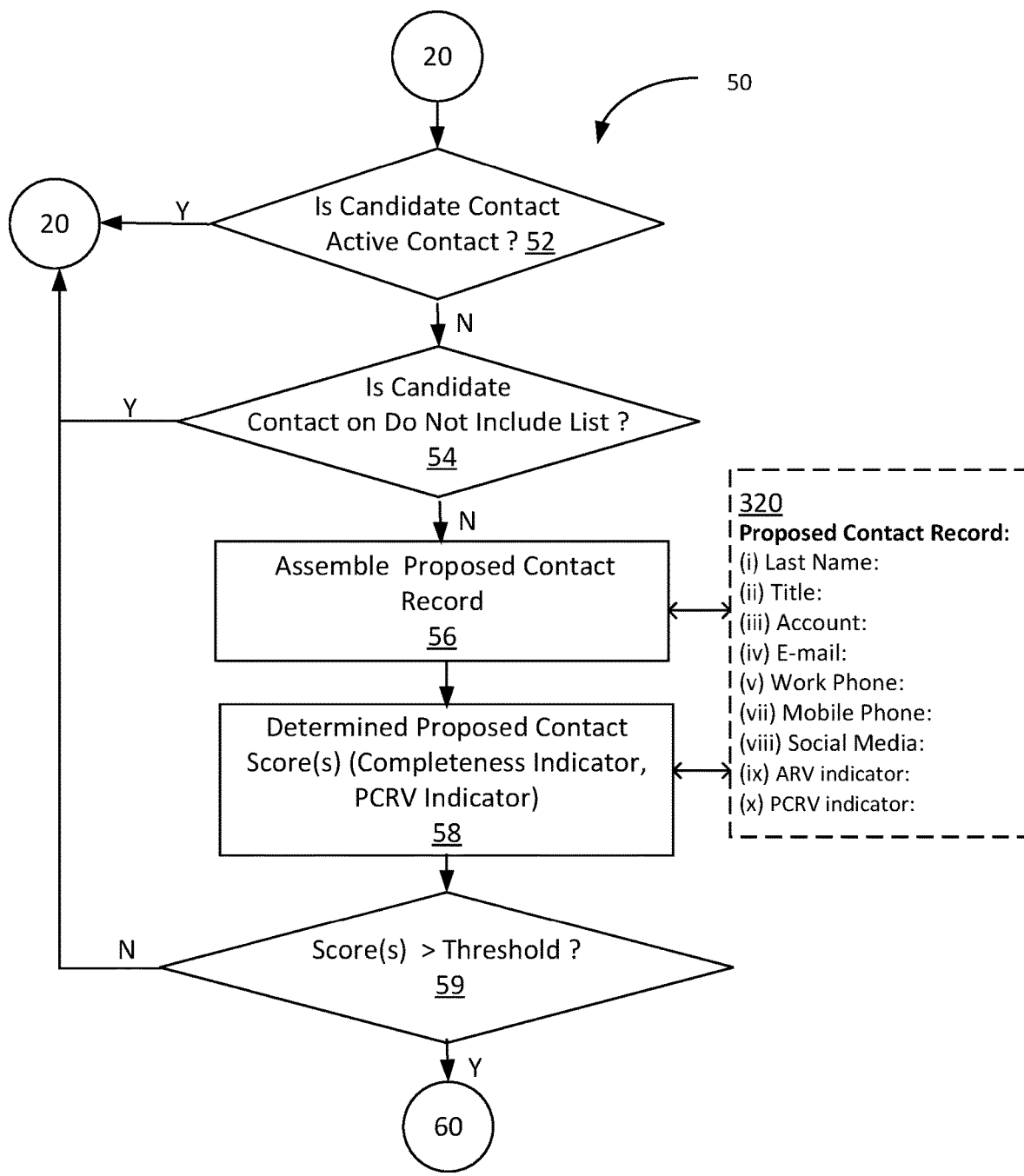
FIG. 5 is a flow chart illustrating actions performed by the data cleanse system to determine if a candidate contact should be added to a proposed contact list, according to example embodiments.

As indicated in block 50, in example embodiments, data cleanse system 300 is configured to determine, based on one or more contact attributes and predetermined criteria, if the candidate contact should be proposed as a new contact. FIG. 5 illustrates a set of actions 52 to 59 that may be performed as part of a new contact filtering function by data cleanse system 300 as part of block 50. In an example embodiment, as indicated by action 52, a determination is made as to whether the existing contact data retrieved in block 20 indicates that the candidate contact is already identified as an existing active contact. If the candidate contact is determined to be an existing active contact, then no further action is taken in respect of that contact, and the process reverts to block 20 to consider the next candidate contact included in contact interaction data 310. However, if it is determined that the candidate contact is not an active contact, then the process moves onto action 54. In example embodiments, a candidate contact can be determined to be a not-active contact in action 52 if: (i) the candidate contact identifier is not present in contact data 106; or (ii) contact information associated with the candidate contact identifier is present in the contact data 106, but the contact is flagged as "non-active".

Action 54 is performed in respect of candidate contacts that exist in the contact data 102, but are classified or flagged as "non-active". As noted above, non-active contacts can be further classified or flagged as "never add". In action 54, if a non-active contact is flagged as "never add", then no further action is taken in respect of that contact, and the process reverts to block 20 to consider the next candidate contact included in contact interaction data 310. Otherwise, the process continues to action 56. In action 56, data cleanse system 300 is configured to assemble a proposed contact record 320 for the candidate contact that enriches the contact information for the candidate contact that was included in contact interaction data 310. In example embodiments, contact information for the candidate contact known from the contact interaction data 310 will include at least one contact identifier such as an email address or phone number, and the data cleanse system 300 is configured to try and populate at least the following contact information fields of the proposed contact record 320 for the candidate contact: (i) first name; (ii) last name; (iii) title; (iv) account (e.g., the name of the customer entity that the candidate contact is a member of or represents); (v) email address; (vi) landline work phone; (vii) mobile phone; and (viii) social media links (e.g., LinkedIn™ profile URL, twitter URL); and (ix) ARV indicator. In example embodiments, at least some of this information may already be stored in the customer data 102 of relationship data storage 100 as part of the contact records 108 associated with a non-active contact or information associated with a customer organization 190 that can be identified by the domain name included in the contact identifier. In some example embodiments, the data cleanse system 300 may obtain some of the contact information directly or indirectly from third party data provider database 280 that includes curated lists of business and customer contact information that may be searchable based on the known contact identifier. In some examples, data cleanse system 300 may obtain some of the contact information via CRM system 200 from CRM database 170.

As indicated above, the proposed contact record 320 can include a field for the ARV indicator that indicates a perceived existing relationship value of the enterprise 180 with the customer organization 190 the candidate contact is associated with. As described above, the ARV indicator for a customer organization 190 is determined and tracked by the CRM support system 120 on an ongoing basis and is part of the general organization data 104 stored in relationship data storage 100.

In action 58, data cleanse system 300 is configured to determine one or more scores for the candidate contact based on the information included in the proposed contact record 320. In an example embodiment, two scores may be determined as will be described below, namely a proposed contact record completeness indicator, and a proposed contact relationship value (PCRV) indicator. The completeness indicator is a metric that measures how much contact information is available in the proposed contact record 320 for the candidate contact, and is based on an assumption that the number of fields populated in the proposed contact record 320 is indicative of the value of classifying a candidate contact as a proposed new active contact. For example, if the data cleanse system 300 is unable to locate information to populate more than one or two fields of the proposed contact record 320 for a candidate contact, then there is a high likelihood that the candidate contact has a low public profile and has had only limited prior contact with the enterprise 180. In such case, is may be assumed, in example embodiments, that the candidate contact is not worth adding as an active contact. In this regard, in one example embodiment, a respective value (e.g. 1 point or 2 points) may be assigned to each of the respective fields of the proposed contact record 320 and then the completeness indicator determined by summing the points for fields that that have been populated.

In example embodiments, the PCRV indicator is intended to represent a perceived importance or value of the candidate contact, as determined based on one or more criteria. In an example embodiment, the PCRV indicator may be based on a combination of three attributes: (1) a contact position score for the candidate contact, as represented by a score assigned to the candidate contact based on the contact's title within the customer organization, as described above in respect of the MCRV indicator; (2) a perceived customer organization importance, as represented by an organization importance score for the candidate contact's organization, determined based on size as indicated above in respect of the MCRV indicator; and (3) the existing ARV indicator for the candidate contact's organization. In example embodiments, the three attributes are combined according to a defined function to generate the PCRV indicator for the candidate contact. The defined function can take different forms in different embodiments. For example, the PCRV indicator for a candidate may be determined using a rules based deterministic function in which the three attributes are multiplied together (e.g., contact position score*organization size score*ARV indicator), summed together or combined in another manner. In example embodiments, the resulting value could be scaled such that the PCRV indicator for a candidate contact was within a defined range (e.g., a range of 0 to 5). In some examples, a predictive model could be trained to implement the defined function used to generate the PCRV indicator. In an example embodiment, as part of action 58, the PCRV indicator is added to the proposed contact record 320.

As indicated in action 59, the data cleanse system 300 is configured to determine if the completeness indicator and PCRV indicator calculated in respect of a candidate contact meet one or more predetermined thresholds. In some example embodiments, a "threshold achieved" (e.g., yes) determination in action 59 requires that each of the completeness indicator and PCRV indicator must meet respective thresholds; in some example embodiments, a "threshold achieved" (e.g., yes) determination in action 59 may require only one of the completeness indicator and PCRV indicator must meet its respective threshold; in yet further example embodiments, a "threshold achieved" (e.g., yes) determination in action 59 requires that the completeness indicator and PCRV indicator collectively meet a composite threshold.

If a determination is made in action 59 that the threshold is not achieved (e.g., a "no" determination), then no further action is taken in respect of that candidate contact, and the process reverts to block 20 to consider the next candidate contact included in contact interaction data 310. Otherwise, the process continues to block 60 and the proposed candidate record 320 for the candidate contact is added to proposed new contact list 330. In example embodiments, blocks 20, 50, 60 are repeated until all candidate contacts that have contact identifiers included in the contact interaction data 310 have been processed, following which the proposed new contact list 330 will include proposed contact records 320-1 to 320-N corresponding to the N candidate contacts that successfully pass decision block 50.

As indicated in block 70A, the proposed new contact list 330 is then provided through communication network 150 to the data steward module 118 of the CRM support agent 114 hosted at enterprise network 110.

Referring again to FIG. 2, as indicated at block 230, the data steward module 118 receives a copy of the proposed new contact list 330. In example embodiments, data steward module 118 is configured to present the candidate contacts included in the proposed new contact list 330 to a decision making authority who can then determine an appropriate action to take in respect of the candidate contacts. In example embodiments, the decision making authority is an individual member (e.g., data steward 400) of the enterprise 180 who has been authorized to make decisions about customer data. Based on the input from the data steward 400, the data steward module modifies the proposed contact records 320 included in proposed new contact list 330 to generate a modified new contact list 330M comprising modified proposed contact records 320M.

Figure 6:
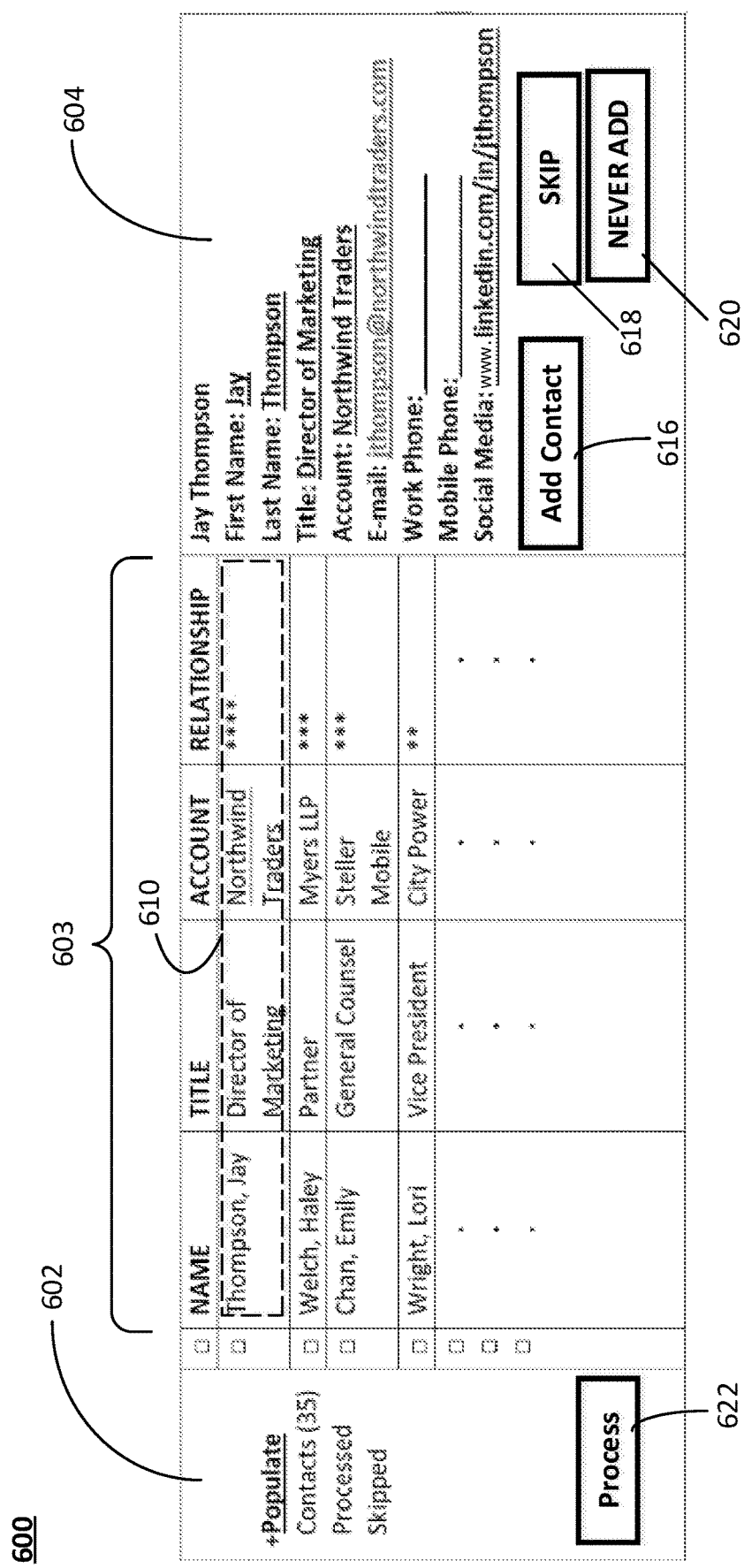
FIG. 6 is an example of a user interface display generated by the data steward module according to an example embodiment.

In this regard, referring to FIG. 6, in example embodiments, data steward module 118 is configured to generate an interactive user interface display 600 for the data steward 400, using a display device. As illustrated, user interface display 600 includes three display regions, namely a task selection region 602 that allows the data steward 400 to select between different data cleaning task options, a contact record display region 603 that displays information for a plurality of contacts in table form, and a contact processing region 604 that displays additional details about a respective contact selected by the data steward 400 from the contact record display region 603.

In the illustrated embodiment, the contact record display region 603 displays information, about candidate contacts, that is derived from the proposed contact records 320-1 to 320-N of the proposed new contact list 330, including from example: name, title, account and relationship. In example embodiments, the "relationship" field may be a graphical representation of the PCRV indicator for the candidate contact. For example, the PCRV indicator for a candidate contact could be represented by "strength bars" or, a number of stars as shown in FIG. 6. By way of example, in FIG. 6, the PCRV indicator for selected candidate contact "Jay Thompson" is graphically illustrated as 4 out of 5 stars, indicating a relatively high PCRV indicator for this candidate.

In example embodiments, the data steward can interact with the displayed information using any appropriate form of user input supported by the display device. As illustrated, the location of an on-screen indicator 610 (e.g. rectangular dashed box in FIG. 6) can be controlled through inputs by the data steward 400 to select and highlight a candidate contact, resulting details about the selected candidate contact appearing in contact processing region 604. In the illustrated examples, data steward module 118 causes user selectable options (e.g., "Add Contact" option 616, "Skip" option 618, and "Never Add" option 620) to be displayed in the contact processing region 604. If the data steward module 118 detects that the "Add Contact" option 616 is selected by data steward 400, an assumption is made that the data steward 400 has determined that the selected candidate contact is to be added as an "active contact" to relationship data 100 and CRM database 170, as described below, and the data steward module 118 causes the corresponding proposed candidate record 320M in its copy of the modified new contact list 330 to be flagged with an "Add Contact" indicator.

However, if the data steward module 118 detects that the "Skip" option 618 is selected by data steward 400, an assumption is made that the data steward 400 has determined that the selected candidate contact is to be skipped and not added as an "active contact" at the current time, and the data steward module 118 causes the proposed candidate record 320M in its copy of the modified new contact list 330M to be flagged with a "Skip" indicator. For example, the data steward 400 may select the "Skip" option 618 in a situation where the data steward 400 concludes that the candidate contact should not be added as an active contact at present, but may worth reconsidering if that candidate contact is presented again in the future.

As noted above, in example embodiments, contacts that are flagged with a "not-active" indicator in contact data 106 stored at relationship data storage may also include a "never add" indicator. Accordingly, in at least some example embodiments, the data steward module 118 provides "Never Add" option 620. if the data steward module 118 detects that the "Never Add" option 620 is selected by data steward 400, an assumption is made that the data steward 400 has determined that the selected candidate contact is never to be added as an "active contact", and the data steward module 118 causes the proposed candidate record 320M in its copy of the modified new contact list 330M to be flagged with a "Never Add" indicator.

By way of example, a candidate contact may be presented that the Data Steward 400 recognizes as being a personal connection of a member 182 that would not be appropriate to add as an active contact ever. (e.g., an undergrad student child emailing a parent member 182 using the child's university assigned email address domain may be identified by data cleanse system 300 as a candidate contact based largely on the customer organization importance score and the ARV indicator for the university, but adding that child as an active contact for the university would not be appropriate).

In example embodiments the data steward module 118 is configured to accept additional or corrective inputs by the data steward 400 to the contact information fields displayed in contact processing region 604. If the changes are made, the data steward module 118 causes the respective fields of the proposed candidate record 320M in its copy of the modified new contact list 330M to be modified accordingly.

Thus, in example embodiments, interactive user interface display 600 generated by data steward module 118 enables the data steward 400 to indicate whether candidate contacts included in proposed new contact list 330 should be added as active contacts, skipped for the current time, or never added. In some examples, one of the options could be set as a default option (e.g., a candidate contact will be flagged by with an "Add Contact" indicator by data steward module 118 unless instructed otherwise). In some examples, interactive user interface display 600 enables the data steward 400 to modify the contact information of candidate contacts.

In the illustrated example, the user interface display 600 includes a user selectable "process" option 622 that can be selected by the data steward 400 when the data steward 400 has completed their review. When data steward module 118 detects selection of the process option 622, it is configured to complete any instructed updates to its copy of the modified new contact list 330M. The modified new contact list 330M is then provided as feedback to the data cleanse system 300, as indicated in block 250 of FIG. 2. In example embodiments, data steward module 118 is configured to automatically send this feedback through communication network 150 to data cleanse system 300 after the "process" option 622 has been selected. The modified new contact list 330M may be sent data cleanse system 300 as it becomes available, or may be sent as part of a periodic batch process (e.g. at the same time that connector 116 provides updated information to the CRM support system 120)

Referring to FIG. 4, in example embodiments the data cleanse system 300 receives the modified new contact list 330M as feedback from the data steward module 118 (Block 70B), and then automatically processes the data (Block 80) to determine how the candidate contacts should be handled. In particular, as indicated in block 90, the data cleanse system 300 communicates with CRM system 200 to add all of the candidate contacts that are flagged with "add contact" indicators as active contacts to the CRM database 170. In example embodiments, this may register each new contact with CRM system 200 to assign the contact a new CRM ID, and create a corresponding CRM contact record 178.

In example embodiments, the data cleanse system 300 is configured to update the contact data 106 of the relationship data storage 100. As noted above, the proposed contact records 320 included in the proposed new contact list 330 in block 60 may include candidate contacts that were already included in respective contact records 108 of the contact data 106 as "non-active" contacts 192, as well as candidate contacts that were previously unknown to CRM support system 120 and thus not represented in the existing contact data 106. Accordingly, the modified new contact list 330M received as feedback from the data steward module 118 in block 70B will similarly include candidate contacts that already have contact records 108 included in the contact data 106 as "non-active" contacts 192, as well as candidate contacts that were previously unknown to CRM support system 120.

In the case of candidate contacts that were already included in the contact data 106 as "non-active" contacts 192, the data cleanse system 300 is configured to update the contact record 108 for such contact 192, if required, to reflect the indicators added by the data steward module 118. For example, an existing "non-active" contact 192 that corresponds to a candidate contact flagged by data steward module 118 as with an "add contact" indicator will have its status changed in contact data 106 to "active". An existing "non-active" contact 192 that corresponds to a candidate flagged as with a "never add" indicator by data steward module 118 will have its status changed in contact data 106 to "never add". The "non-active status" of an existing "non-active" contact 192 that corresponds to a candidate flagged as with a "skip" indicator by data steward module 118 will remain the same. The CRM ID for the contact 192 will be added to the contact record 108 if available and not already included.

In the case of candidate contacts that were not previously included in the contact data 106, the data cleanse system 300 is configured to create a new contact record 108 and register the candidate contact as a contact 192 to the contact data 106 based on the information included in the modified new contact list 330M. The contact 192 will be flagged with an "active" indicator, "non-active indicator" and/or "never" add" indicator as specified by the information included in the modified new contact list 330M, and assigned an CRM support ID. The CRM ID will be added to the contact record 108 if available.

Accordingly, in an example embodiment, CRM support agent 114 and data cleanse system 300 of CRM support System 120 are configured to assist with the detection and addition of new contacts 192 to CRM system 200. This process is largely automated such that information is collected and assembled automatically and then presented to the data steward 400 in a user friendly efficient manner. With minimal effort, the data steward 400 can flag candidate contacts, and the CRM system 200 and relationship storage data 100 are then automatically updated based on the data steward input.

(ii) System and Method for Detecting and Archiving Obsolete Client Data in a CRM System.

As noted above, detecting and archiving obsolete contacts 192 can be a resource and labour intensive exercise. In many cases, deciding that a contact is obsolete requires a recognition that interaction with the client has fallen below an acceptable level. However, the acceptable level of interaction may vary based on a perceived importance of the contact. Accordingly, in an example embodiment, CRM support agent 114 and data cleanse system 300 of CRM support System 120 are configured to assist with the detection and archiving of obsolete contacts 192 in CRM system 200 and CRM support system 120.

As described above, connector 116 is configured to collect information about interactions between users associated with the enterprise network 110 (e.g. members 182 of enterprise 180) and external contacts 192, and provide reports about these interaction (e.g., contact interaction data 310) to CRM support system 120. In example embodiments, CRM support system 120 regularly updates, based on the contact interaction data 310 received from connector 116, the member-contact and enterprise-contact communication interaction history that is maintained as part of the respective contact record 108 for each of the contacts 192 tracked in contact data 106. For each communication interaction, the interaction history can include, among other things: the type of interaction (e.g., email message, meeting (which may be further classified as in-person, video/screen share, or audio-only if that information is available), or telephone call); time stamp information for the interaction, and a member identifier (e.g., data that identifies the member(s) 182 of the enterprise 180 that was/were involved in the interaction with the contact 192). As described above, this information is used to generate MCRV indicators that represent the value of specific member-contact relationships, which in turn can be used to generate TCV indicators that represent the overall value of a particular contact 192 and an ARV indicator that represents an overall enterprise-customer organization relationship.

Figure 7:
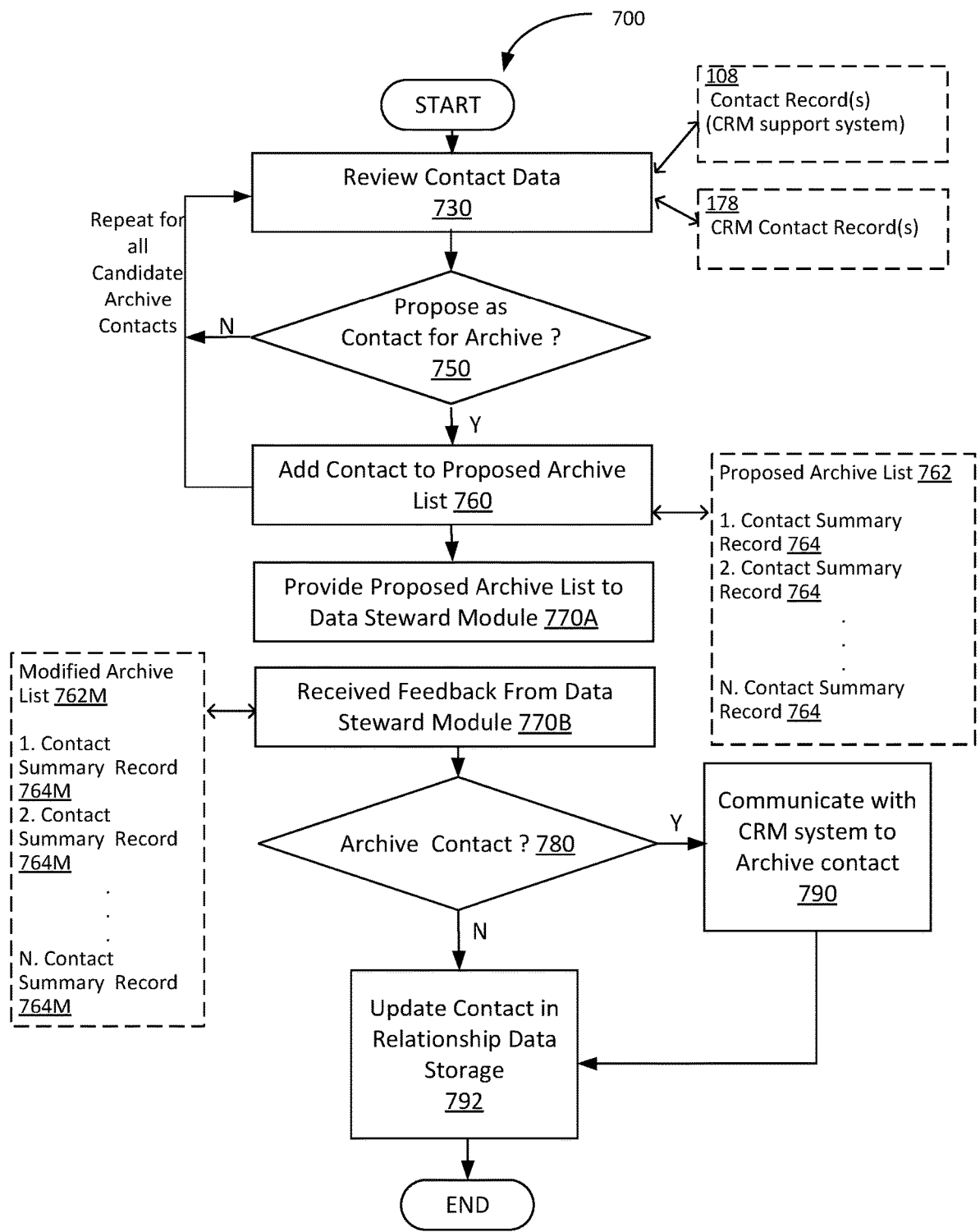
FIG. 7 is a flow chart illustrating processes that can be performed by a data cleanse system included in the CRM support system of FIG. 1, according to example embodiments, to support archiving of contacts.

FIG. 7 illustrates an example of an archive process 700 that is performed by data cleanse system 300 in example embodiments to identify and archive contacts. In example embodiments, data cleanse system 300 is configured to automatically commence archive process 700 on a periodic basis, for example daily or weekly, or when a defined threshold occurs, for example the number of active contacts reaches a defined amount. In some examples, archive process 700 may be triggered by an instruction from a system administrator or by an instruction received through communication network 150 from CRM support agent 114.

As indicated in blocks 730, 750 and 760, as part of archive process 700, data cleanse system 300 is configured to review the contact records 108 stored as contact data 106 in relationship data storage 100, determine what contacts 192 should be proposed for archiving, and add the proposed archive candidates to a proposed archive list 762. In cases where CRM database 170 includes additional contact information beyond that included in relationship data storage 100, CRM contact records 178 may also be consulted.

Figure 8:
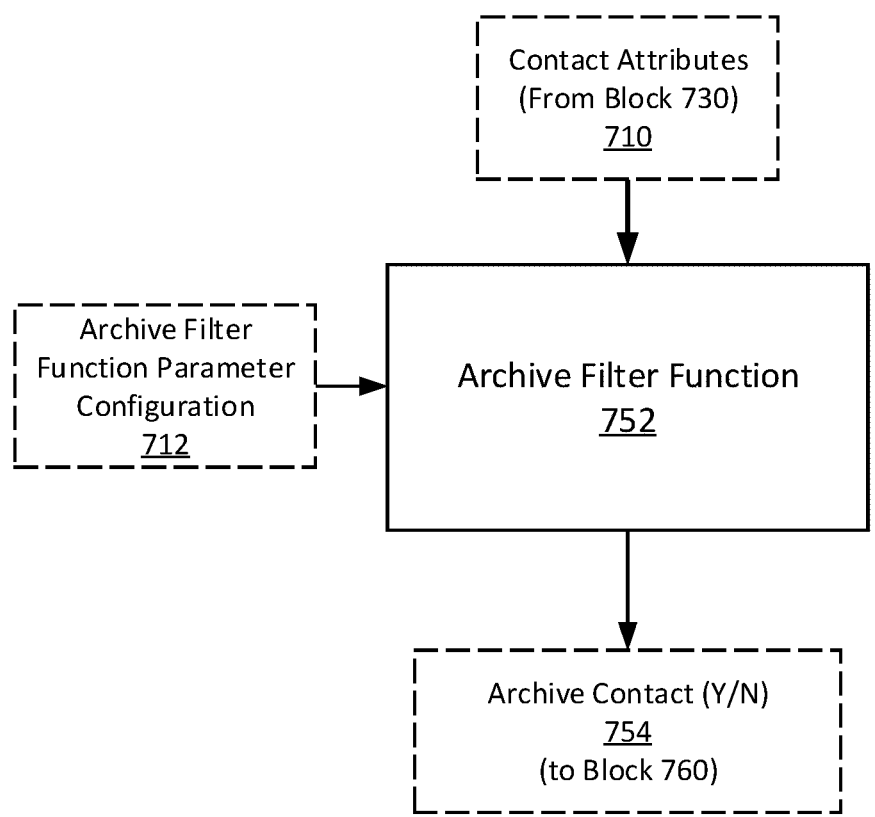
FIG. 8 is a block diagram of an archive filter function of the data cleanse system.

In this regard, FIG. 8 graphically represents an archive filter function 752 applied by data cleanse system 300 during the performance of determination block 750, according to example embodiments. Archive filter function 752 is configured to receive a set of contact attributes for a contact 192 from contact records 108, apply one or more filtering criteria based on a predetermined archive filter function parameter configuration 712, and generate an output 754 indicating if that contact 192 should be proposed as an archive contact or not.

In an example embodiment, the archive filter function 752 can include a set of rule-based determinations, and the archive filter function parameter configuration 712 may set values for a set of parameters that are applied in accordance with the rules. In some examples, the archive filter function parameter configuration 712 may be a default set of parameters that is applied in respect of all customer organizations. In some examples, the archive filter function parameter configuration 712 may be tailored specifically to a particular organization or to a class of organizations (e.g., industry type such as law firm, accounting firm, software supplier).

By way of example, contact attributes 710 that are considered in respect of a candidate archive contact may include the TCV indicator for the contact, and/or one or more of the individual metrics that are used to determine the TCV indicator (e.g., contact position score, organization importance score, and member-contact relationship strength ("MCRS") scores). The archive filter function parameter configuration 712 may specify threshold values or ranges for these contact attributes 710, or composite threshold values or ranges for combinations of these contact attributes 710. In example embodiments the individual attributes used to determine MCRS scores (e.g. frequency and timing of specific types of communication) may be individually considered with different timing and/or weighting parameters set for each, including for example a date of last email communication, date of last meeting, date of last phone call.

By way of one non-limiting example, archive filter function 752 may be configured to determine that a contact 192 should be proposed as an archive candidate contact if the TCV indicator (which as noted above is a composite value contact position score, organization importance score), and MCRS scores (which themselves are composite values representing communication interaction history) falls below a threshold value that is specified in the archive filter function parameter configuration 712. In a further example embodiment, archive filter function 752 may be configured to determine that a contact should be proposed and an archive candidate contact if: the communication interaction history in respect of the contact 192 indicates no communication has occurred within a threshold period; the contact 192 has a threshold score below a predetermined thresholds; and none of the individual MCRV indicators for the contact 192 exceed a predetermined threshold.

In some examples, some of the thresholds may be sent to lower values for customer organizations 190 that have higher ARS indicators.

In some example embodiments, the archive filter function 752 may alternatively incorporate a predictive function learned using machine learning training techniques, and the archive filter function parameter configuration 712 could comprise a set of learned weights.

In example embodiments, some of the contact attributes 710 may be retrieved from the CRM system 200 to supplement information that is available from the contact data 106.

In example embodiments, some contact records 108 in respect of contacts 192 may include a "Do Not Archive" indicator field. In such embodiments, one of the criteria applied in block 750 will be a determination at to whether the contact record 108 in respect of a contacts 192 has been flagged with a "Do Not Archive" indicator, in which case that contact will be exempt from further consideration for archiving.

Referring again to FIG. 7, contacts 192 that are identified in output 754 as proposed archive candidate contact are added to a proposed archive list 762, as indicated in block 760. In example embodiments, the proposed archive list 762 includes a contact summary record 764 in respect of each proposed archive candidate contact that provides selected information about the archive candidate contact that will be required by the data steward module 118.

After processing contact records 108 to identify a batch of proposed archive candidate contact that are identified by respective contact summary records 764 in proposed archive list 762, the data cleanse system is configured to the send the proposed archive list 762 to CRM support agent 114 via communication network 150, as indicated in block 770A.

Figure 9:
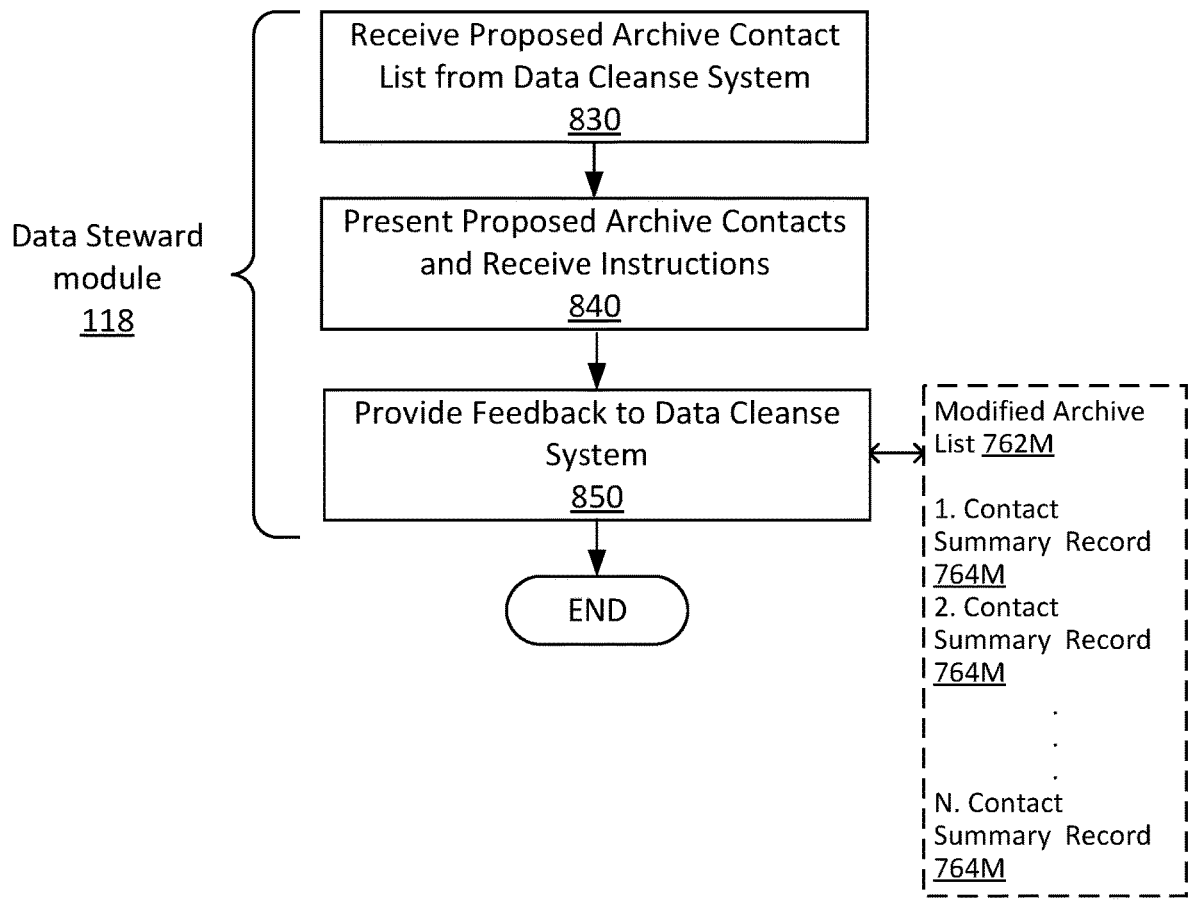
FIG. 9 is a flow chart illustrating operations that can be performed by the data steward module of a CRM support agent included in the client network of FIG. 1, according to example embodiments, to support archiving of contacts.

Referring to FIG. 9, as indicated a block 830, the data steward module 118 of CRM support agent 114 receives a copy of the proposed archive contact list 762. In example embodiments, data steward module 118 is configured to present the candidate contacts included in the proposed new contact list 330 to a decision making authority (e.g., data steward 400) of the enterprise 180 who has been authorized to make decisions about customer data. Based on the input from the data steward 400, the data steward module 118 modifies the proposed contact summary records 764 included in proposed archive contact list 762 to generate a modified archive contact list 762M comprising modified proposed contact records 764M.

Figure 10:
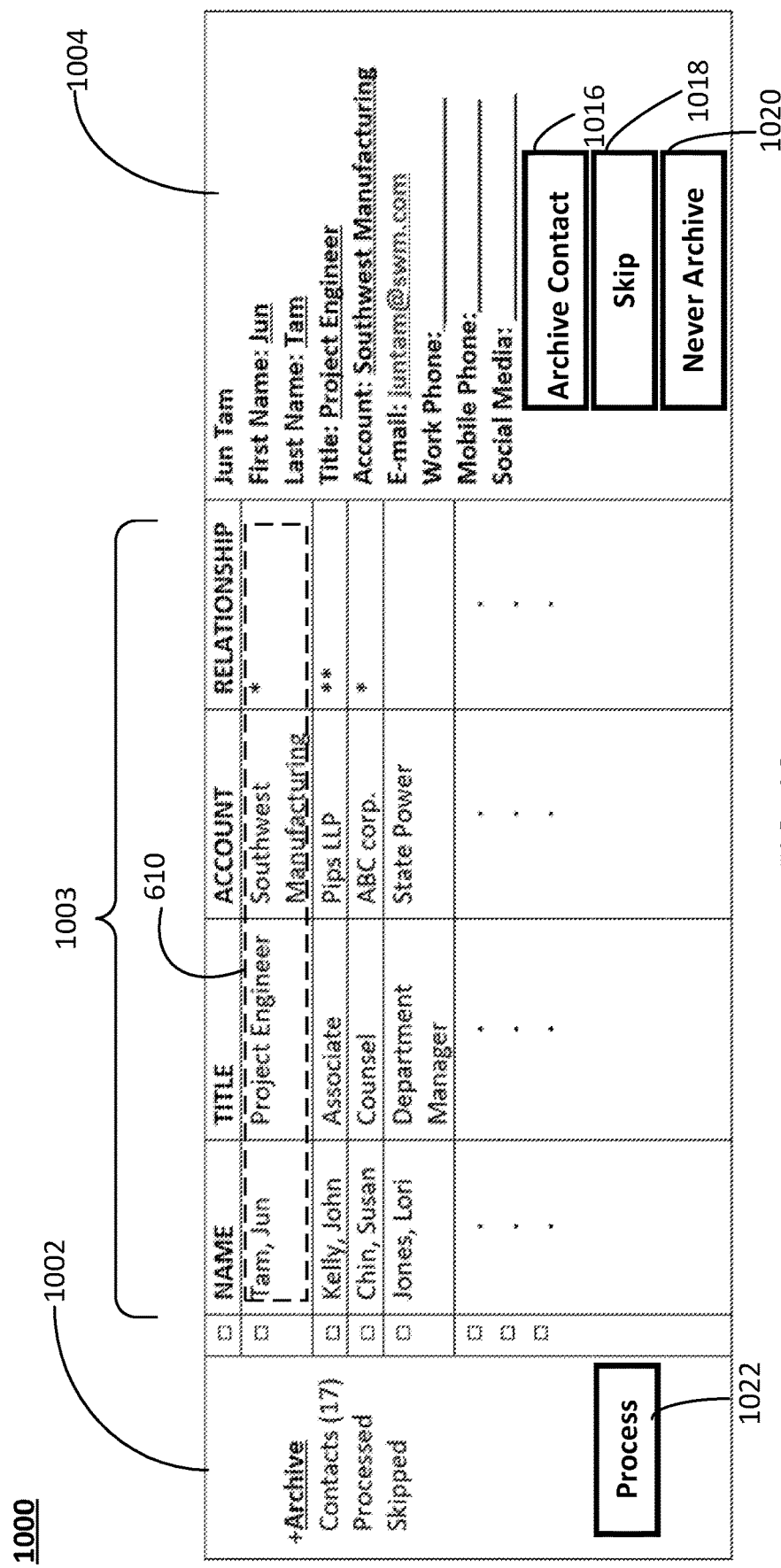
FIG. 10 is an example of a user interface display generated by the data steward module to support contact archiving, according to an example embodiment.

In this regard, referring to FIG. 10, in example embodiments, data steward module 118 is configured to generate an interactive user interface display 1000 for the data steward 400, using a display device. As illustrated, user interface display 1000 may have a similar layout to user interface display 600 described above and includes three display regions, namely a task selection region 1002 that allows the data steward 400 to select between different data cleaning task options, a contact record display region 1003 that displays information for a plurality of proposed archive contacts in table form, and a contact processing region 1004 that displays additional details about a respective contact selected by the data steward 400 from the contact record display region 1003.

In the illustrated embodiment, the contact record display region 1003 displays information, about candidate contacts, that is derived from the proposed archive contact summary records 764 included in proposed archive contact list 762, including from example: name, title, account and relationship. In example embodiments, the "relationship" field may be a graphical representation of the TCV indicator for the proposed archive contact. For example, the TCV indicator for a contact could be represented by "strength bars" or, a number of stars as shown in FIG. 10. Typically, the TCV indicator for a proposed archive contact will be reasonably weak as a value representing frequency and recentness of communications.

In example embodiments, the data steward 400 can interact with the displayed information in the same manner as described above in respect of user interface display 600 to select and highlight a proposed archive candidate contact, and cause resulting details about the selected contact to appear in contact processing region 1004. In the illustrated examples, data steward module 118 causes user selectable options (e.g., "Archive Contact" option 1016, "Skip" option 1018, and "Never Archive" option 1020) to be displayed in the contact processing region 1004. If the data steward module 118 detects that the "Archive Contact" option 1016 is selected by data steward 400, an assumption is made that the data steward 400 has determined that the selected contact is to be archived in one relationship data 100 and CRM database 170, as described below, and the data steward module 118 causes the corresponding proposed contact summary record 764M in its copy of the modified archive contact list 762M to be flagged with an "Archive Contact" indicator.

If the data steward module 118 detects that the "Skip" option 1018 is selected by data steward 400, an assumption is made that the data steward 400 has determined that the selected contact is to skipped and not archived at the current time, and the data steward module 118 causes the proposed archive contact summary record 746M in its copy of the modified archive contact list 762M to be flagged with a "Skip" indicator.

As noted above, in example embodiments, contact records 108 may be flagged with a "never archive" indicator in contact data 106. Accordingly, in at least some example embodiments, the data steward module 118 provides "Never Archive" option 1020. if the data steward module 118 detects that the "Never Archive" option 1020 is selected by data steward 400, the data steward module 118 causes the proposed contact summary record 764M in its copy of the modified contact summary list 762M to be flagged with a "Never Archive" indicator.

In example embodiments the data steward module 118 is configured to accept additional or corrective inputs by the data steward 400 to the contact information fields displayed in contact processing region 1004. If the changes are made, the data steward module 118 causes the respective fields of the contact summary record 764M in its copy of the modified proposed archive list 762M to be modified accordingly.

Thus, in example embodiments, interactive user interface display 1000 generated by data steward module 118 enables the data steward 400 to indicate whether proposed archive candidate contacts included in proposed archive contact list 762 should be archived, skipped for the current time, or never archived. In some examples, one of the options could be set as a default option. (e.g., a candidate contact will be flagged with a "Skip" indicator by data steward module 118 unless instructed otherwise).

In the illustrated example, the user interface display 1000 includes a user selectable "process" option 1022 that can be selected by the data steward 400 when the data steward 400 has completed their review. When data steward module 118 detects selection of the process option 1022, it is configured to complete any instructed updates to its copy of the modified archive contact list 764M. The modified archive contact list 762M is then provided as feedback to the data cleanse system 300, as indicated in block 850 of FIG. 9. In example embodiments, data steward module 118 is configured to automatically send this feedback through communication network 150 to data cleanse system 300 after the "process" option 1022 has been selected. In various example configurations, the modified archive contact list 762M may be sent data cleanse system 300 as it becomes available, or may be sent as part of a periodic batch process.

Referring to FIG. 7, in example embodiments the data cleanse system 300 receives the modified archive list 762M as feedback from the data steward module 118 (Block 770B), and then automatically processes the data (Block 780) to determine how the candidate archive contacts should be handled. In particular, as indicated in block 790, the data cleanse system 300 communicates with CRM system 200 to instruct the CRM system 200 to archive all of the candidate contacts that are flagged with "archive contact" indicators. In some examples, CRM system 200 may archive contacts by removing their respective CRM contact records 178 from CRM database 170 (and perhaps to a secondary archive database), by flagging the record 178 as "archived", by flagging the record 178 as "not-active", or by a combination of the forgoing.

In example embodiments, the data cleanse system 300 is also configured to update, as required, the contact records 108 stored in contact data 106 of the relationship data storage 100.

In the case of candidate archive contacts flagged with an "archive" indicator, the data cleanse system 300 is configured to update the contact record 108 for such contact 192 by flagging the record with a "not-active" indicator and an "archived" indicator. In some examples, data cleanse system 300 may move the contact record 108 from an active, non-archived record storage of relationship data storage 100 to an archive storage.

In the case of candidate archive contacts flagged with a "Never Archive" indicator, the data cleanse system 300 is configured to update the contact record 108 for such contact 192 by flagging the record with a "never archive" indicator.

In the case of candidate archive contacts flagged with a "Skip" indicator, the data cleanse system 300 may take no action, or may alternatively update the contact record 108 for such contact 192 to indicate that it was considered for archiving and the date of such consideration.

Accordingly, in an example embodiment, CRM support agent 114 and data cleanse system 300 of CRM support System 120 are configured to assist with the archiving of existing contacts 192 in CRM system 200 and relationship data storage 100. This process is largely automated such that information is collected and assembled automatically and then presented to the data steward 400 in a user friendly efficient manner. With minimal effort, the data steward 400 can flag pre-screened candidate archive contacts, and the CRM system 200 and relationship storage data 100 are then automatically updated based on the data steward input.

(iii) System and Method for Detecting and Removing Client Data for Privacy Policy Compliance.

Detecting and removing contact data to comply with privacy policy can be a resource and labour intensive exercise. In some cases, the enterprise 180 may be obligated to remove information from its customer data 102 stored in relationship data storage and from customer data stored in CRM database 170 to comply with privacy obligations that can arise from one or more of a combination of: Government implemented privacy laws and regulations; privacy requirements that the enterprise 180 has established; privacy requirements that are contractually mandated by relationships with customer organizations 190, and privacy requirements established by industry associates and governing bodies that the enterprise 180 is a member of. In many cases the enterprise 180 will establish one or more privacy policies to ensure that all of its privacy obligations and requirements are complied with. From the perspective of enterprise 180, privacy policy requirements can vary based on the jurisdiction that activities occur in the customer organizations 190 that such activities occur in.

Accordingly, in an example embodiment, part of the general customer data 104 that is stored in relationship data storage 100 in respect of a customer organization 190 (also known as an "account") includes a customer privacy policy (CPP). The customer privacy policy for a particular customer organization 190 may include multiple jurisdiction and/or industry specific sub-policies. The CPP for a particular customer organization 190 could be based on a default CPP established by enterprise 180 that is customized as required for specific customer organizations 190.

In an example embodiment, CRM support agent 114 and data cleanse system 300 of CRM support System 120 are configured to assist with the detection and removal or modification of contact data in CRM system 200 and CRM support system 120 in order to assist with privacy policy compliance.

Figure 11:
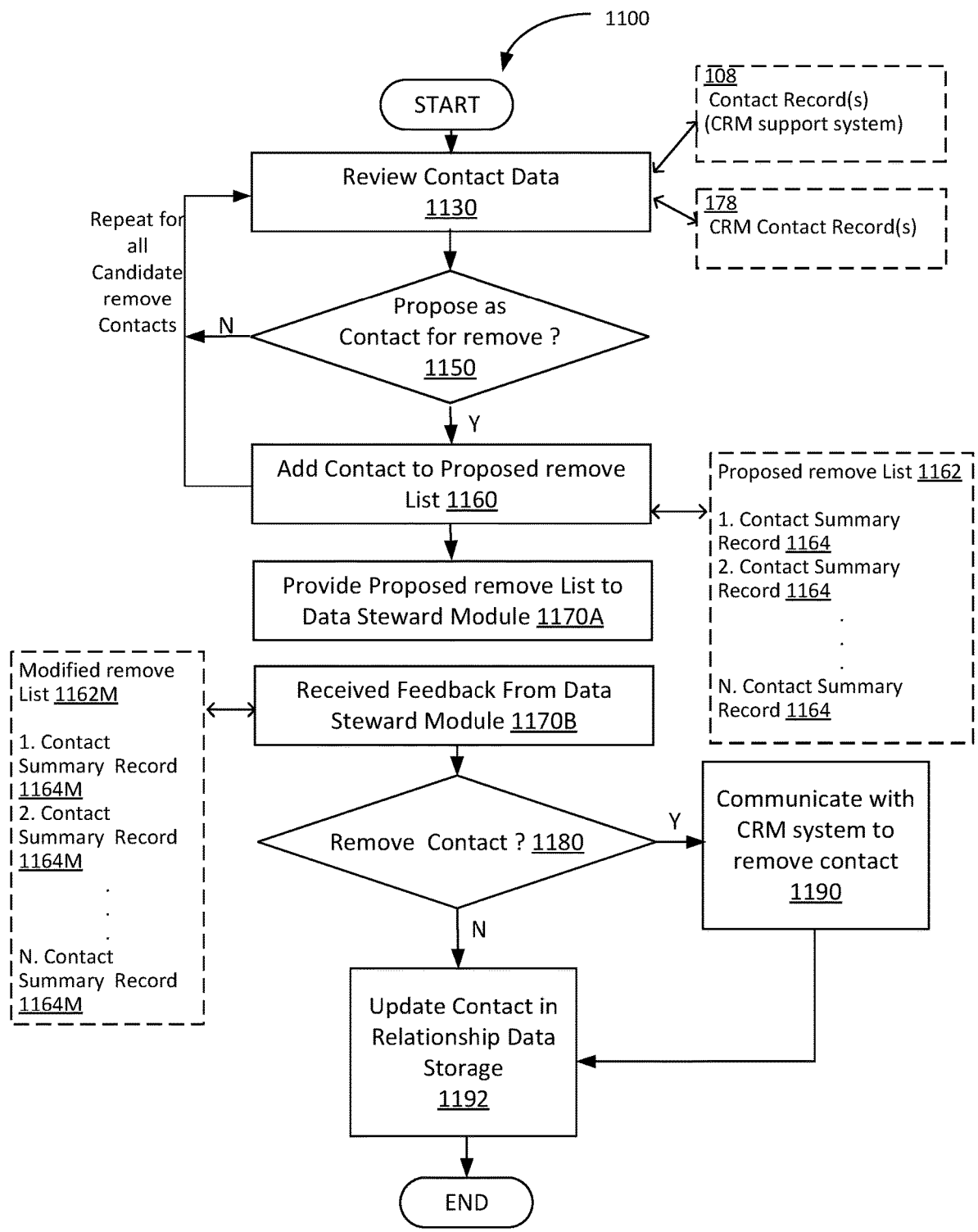
FIG. 11 is a flow chart illustrating processes that can be performed by the data cleanse system included in the CRM support system of FIG. 1, according to example embodiments, to privacy policy compliance.

FIG. 11 illustrates an example of a privacy compliance process 1100 that is performed by data cleanse system 300 in example embodiments to identify and remove contacts. In example embodiments, data cleanse system 300 is configured to automatically commence privacy compliance process 1100 on a periodic basis (for example daily or weekly), or when a defined threshold occurs. In some examples, privacy compliance process 1100 may be triggered by an instruction from a system administrator or by an instruction received through communication network 150 from CRM support agent 114.

As indicated in blocks 1130, 1150 and 1160, as part of remove process 1100, data cleanse system 300 is configured to review the contact records 108 stored as contact data 106 in relationship data storage 100, determine which contacts 192 should be considered for privacy policy compliance and to add such contacts to a proposed remove list 1162. In cases where CRM database 170 includes additional contact information beyond that included in relationship data storage 100, CRM contact records 178 may also be consulted.

Figure 12:
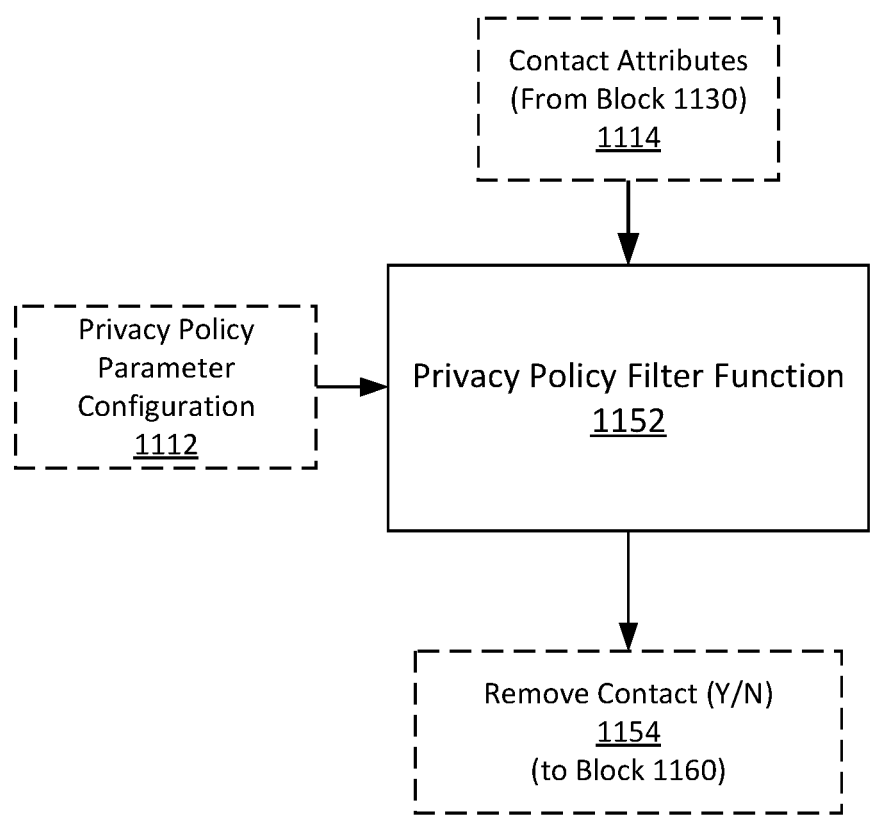
FIG. 12 is a block diagram of a privacy policy filter function of the data cleanse system.

In this regard, FIG. 12 graphically represents a privacy policy filter function 1152 applied by data cleanse system 300 during the performance of determination block 1150, according to example embodiments. Privacy policy filter function 1152 is configured to receive a set of contact attributes 1114 for a contact 192 from contact records 108, apply one or more filtering criteria based on a predetermined privacy policy parameter configuration 1112, and generate an output 1154 indicating if that contact 192 should be proposed as a contact for whom corresponding contact data should be removed or not.

In an example embodiment, the privacy policy filter function 1152 can include a set of rule-based determinations, and the privacy policy parameter configuration 1112 may set values for a set of parameters that define how the rule-based determinations are applied. In example, embodiments, the privacy policy parameter configuration 1112 that is applied when considering the contact 192 of a customer organization 190 is based on the customer privacy policy (CPP) that has been established and is stored in respect of the subject customer organization 190 in general customer data 104 in relationship data storage 100.

By way of example, contact attributes 1114 may include some or all of the attributes discussed above in respect of archive filter function 752. The privacy policy parameter configuration 1112 may specify threshold values or ranges for these contact attributes 1114, or composite threshold values or ranges for combinations of these contact attributes 1114. In example embodiments the individual attributes used to determine MCRS scores (e.g. frequency and timing of specific types of communication) may be individually considered with different timing and/or weighting parameters set for each, including for example a date of last email communication, date of last meeting, date of last phone call.

By way of one non-limiting example, privacy policy filter function 1152 may be configured to determine that a contact 192 should be proposed as a remove candidate contact based on the same or similar rules discussed above in respect of archive filter function 752. In some examples, privacy policy filter function 1152 may be configured to determine that a contact should be proposed as a remove candidate contact if: the communication interaction history in respect of the contact 192 indicates no communication has occurred within a threshold period that is required by the CPP.

In some examples, the contact record 108 may include one or more privacy fields that may be used to indicate whether or not a particular contact 192 has taken some action to indicate that they have opted out of a privacy requirement. In at least some examples, privacy policy filter function 1152 may be configured to determine that a contact 192 should be proposed as a remove candidate contact if one or more of the privacy indicators indicates a particular contact 192 has not opted out of a privacy requirement and contact data indicates that the privacy requirement will be violated.

In some example embodiments, the privacy policy filter function 1152 may alternatively incorporate a predictive function learned using machine learning training techniques, and the privacy policy parameter configuration 1112 could comprise a set of learned weights.

In example embodiments, some of the contact attributes 1114 may be retrieved from the CRM system 200 to supplement information that is available from the contact data 106.

Referring again to FIG. 11, contacts 192 that are identified in output 1154 as proposed remove candidate contact are added to a proposed remove list 1162, as indicated in block 1160. In example embodiments, the proposed remove list 1162 includes a contact summary record 1164 in respect of each proposed remove candidate contact that provides selected information about the remove candidate contact that will be required by the data steward module 118.

After processing contact records 108 to identify a batch of proposed remove candidate contact that are identified by respective contact summary records 1164 in proposed remove list 1162, the data cleanse system 300 is configured to the send the proposed remove list 1162 to CRM support agent 114 via communication network 150, as indicated in block 1170A.

In example embodiments, the data steward module 118 of CRM support agent 114 is configured to receive a copy of proposed remove list 1162. In example embodiments, data steward module 118 is configured to provide a present the candidate contacts included in the proposed new contact list 330 to data steward 400 for processing in a similar manner as discussed above in respect of contact archiving. Based on the input from the data steward 400, the data steward module 118 modifies the proposed contact summary records 1164 included in proposed remove contact list 1162 to generate a modified remove contact list 1162M comprising modified proposed contact records 1164M that include data steward specified option indicators. In this regard, in example embodiments, the options that are available are as follows: user interface display generated in respect of privacy compliance process 1100 is different from display 1000 generated in respect of archive process 700 in that the "Archive Contact" option 1016 is replaced with a "Remove Contact" option, and the "Never Archive" option is replaced with a "Modify Contact Option".

In at least some example embodiments the "Modify Contact" option is provided to handle the case where it is possible to maintain a stripped down version of a contact record for a contact 192 and still comply with the CPP. For example, it may be possible to maintain a name and title information but no other contact information for a stale contact under the CPP. The "Modify Contact" option may be omitted from the user interface display when it is not available for a contact.

Referring to FIG. 11, in example embodiments the data cleanse system 300 receives the modified remove list 1162M as feedback from the data steward module 118 (Block 1170B), and then automatically processes the data (Block 1180) to determine how the candidate remove contacts should be handled. In particular, as indicated in block 1190, the data cleanse system 300 communicates with CRM system 200 to instruct the CRM system 200 to remove the candidate contacts that are flagged with "remove contact" indicators. In some examples, CRM system 200 may remove contacts by removing their respective CRM contact records 178 from CRM database 170.

In the case of candidate remove contacts flagged with a "Modify Contact Option" indicator, the data cleanse system 300 is configured to instruct the CRM system 200 to update the contact record 178 for such contact 192 to remove any information as required to ensure the compliance with the CPP.

In example embodiments, the data cleanse system 300 is also configured to remove or update, as required, the contact records 108 stored in contact data 106 of the relationship data storage 100. In the case of candidate remove contacts flagged with a "remove" indicator, the data cleanse system 300 is configured to remove the contact record 108 for such contact 192 from relationship data storage 100. In the case of candidate remove contacts flagged with a "Modify Contact Option" indicator, the data cleanse system 300 is configured to update the contact record 108 for such contact 192 to remove any information from the contact record 108 as required to ensure the compliance with the CPP.

In the case of candidate remove contacts flagged with a "Skip" indicator, the data cleanse system 300 may take no action, or may alternatively update the contact record 108 for such contact 192 to indicate that it was considered for archiving and the date of such consideration.

Accordingly, in an example embodiment, CRM support agent 114 and data cleanse system 300 of CRM support System 120 are configured to assist with identification and removal or modification of contact records in CRM system 200 and relationship data storage 100. This process is largely automated such that information is collected and assembled automatically and then presented to the data steward 400 in a user friendly efficient manner. With minimal effort, the data steward 400 can flag pre-screened candidate remove contacts, and the CRM system 200 and relationship storage data 100 are then automatically updated based on the data steward input.

(iv) System and Method for Analyzing Data Points to Identify Individuals.

As noted above, a challenge faced by CRM systems is detecting and processing duplicate contact entries. By way of example, FIG. 13A provides an illustrative example of five contacts, each identified by a unique CRM ID, that are each represented by respective CRM contact records 178 in CRM database 170 and contact records 108 in the relationship data storage 100 of CRM support system 120. As can be seen in FIG. 13A the five contacts all have the same or similar contact name, similar position titles, varying contact departments, and different contact locations. The similarities are such that there is a high likelihood that at least some of the contact entries in FIG. 13A are duplicate contact entries.

Figure 14:
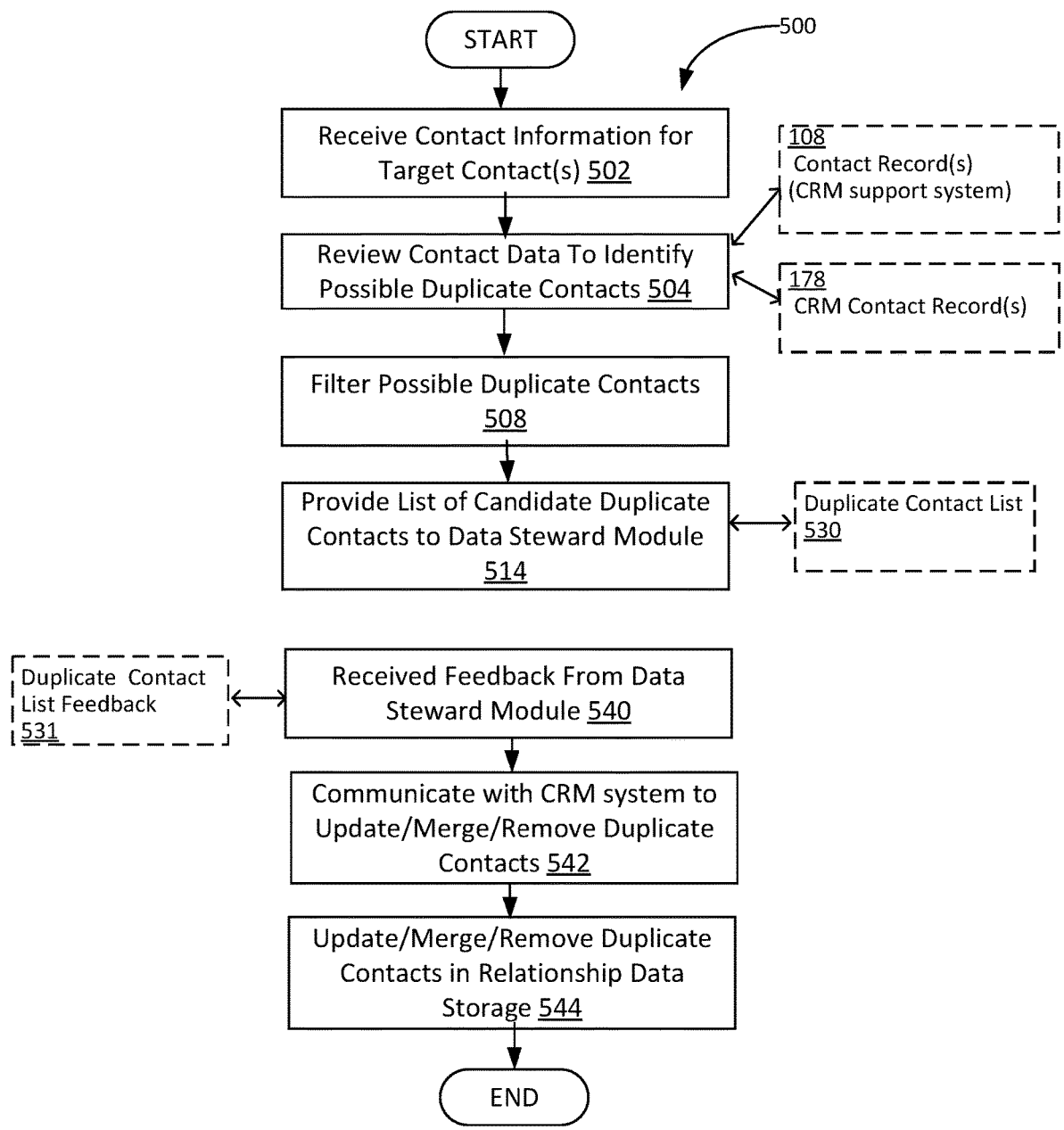
FIG. 14 is a flow chart illustrating processes that can be performed by a data cleanse system included in the CRM support system of FIG. 1, according to example embodiments, to support detection and processing of duplicate contact data.

According to example embodiments, data cleanse system 300 is configured to identify potential duplicate contact entries and enable merging of such entries. FIG. 14 illustrates an example of a duplicate contact process 500 that is performed by data cleanse system 300 in example embodiments to identify candidate duplicate contacts, provide information about the identified duplicate contacts to a decision making authority (e.g., data steward 400), and amend one or both of the CRM database 170 and data stored in the relationship data storage 100 based on feedback from the decision making authority.

In one example embodiment, process 500 is automatically performed whenever CRM support system 120 becomes aware that a new contact has been added to one or both of CRM database 170 and relationship data storage 100. In some examples, process 500 is automatically performed prior to addition of the new contact. In some examples, process 500 may be run as a batch process to identify duplicates in respect of multiple contacts, and in such cases may be performed automatically on a periodic basis, for example daily or weekly, or when a defined threshold occurs. In some examples, process 500 may be triggered by an instruction from a system administrator or by an instruction received through communication network 150 from CRM support agent 114. In at least some example embodiments, such instructions will include an identification of one or more target contacts that the duplicate process 500 is to be performed in respect of.

For explanatory purposes, duplicate process 500 will be described in the context of processing a single target contact. As indicated in block 502, the process commences with data cleanse system receiving information that identifies the target contact. For example, the information could include set of information about the contact (e.g. a contact record) or a link (e.g. a CRM ID or CRM Support ID) to a contact record or other identifier for the target contact.

As indicated at block 504, the data cleanse system 300 is configured to review the contact records 108 stored in relationship data storage 100 to identify any contacts that may be possible duplicates of the target contact. In example embodiments, data cleanse system 300 applies similarity based filtering to identify contacts having associated contact information (e.g., information included in contact records 178) that appear sufficiently similar to known contact information for the target contact that the contact information could be for the same individual. By way of example, data cleanse system 300 may be configured to apply a conventional name matching algorithm such as a fuzzy-logic based name matching algorithm to identify possible duplicate contacts based on similarity between a name of the target contact and the content of the "last name", "first name" fields included in the contact records 178. In scenarios where CRM database 170 includes additional contact information beyond that included in relationship data storage 100, CRM contact records 178 may also be consulted.

By way of illustration, FIG. 13A illustrates possible results generated by block 504 in response to a search, using name matching algorithm, for the target contact "Fred Johnson" who is associated with CRM ID 1. In FIG. 13A, a review of the contact records 108 included in contact data 106 resulted in four contacts being identified who have the same or similar name as the target contact, and thus may be possible duplicate contacts.

Figure 15:
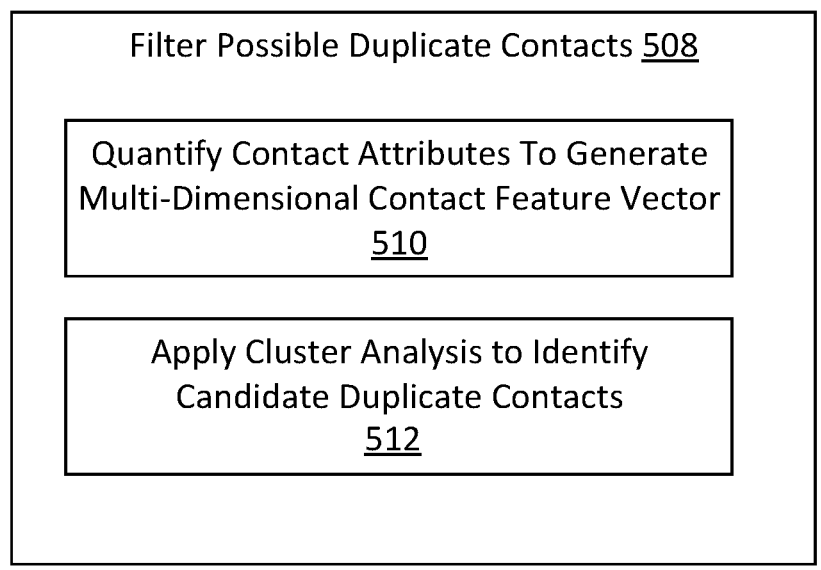
FIG. 15 is a block diagram of actions performed by a filtering function process of FIG. 14.

In at least some example embodiments, as indicated in block 508, a further layer of automated filtering may be applied to the possible duplicate contacts identified in block 504. Actions performed as part of block 508 are illustrated in greater detail in FIG. 15.

Referring to block 510, in example embodiments, the information in the contact record for each possible duplicate contact is used to generate a multi-dimensional feature vector, with each vector dimension representing respective field of the contact record 108. As noted above, the contact record 108 can include a number of data fields that include qualitative data such as in the example of FIG. 13A: "Title", "Department", and "Location". Accordingly, in example embodiments, the qualitative information is converted to numerical values. In this regard, FIGS. 13B, 13C and 13D represent respective look-up table functions for mapping a "Title" to a title score, "Department" to a department score, and "Location" to a location score (e.g., distance from a defined point). In the illustrated example, the relative scores assigned in each look-up-table have been selected to represent a perceived degree of similarity. For example, the scores for "sales" and "marketing" departments are much closer to each other than to the "engineering" score, representing that the same individual is much more likely to move between sales and marketing (or be mistaken for being in one rather than the other) than between either sales or marketing and engineering.

The resulting numerical values each of the identified possible duplicate contacts and the target contact are used to provide a respective multi-dimensional feature vector for each contact, enabling each contact to be represented as a respective data-point in a multi-dimensional feature space.

As indicated in block 512, in example embodiments, cluster analysis can then be applied to the resulting data-points to identify groups of data-points that correspond, with a high degree of probability to the same individual contact. In some examples the clustering could be performed based on rules-based algorithm—for example every data-point within a defined Euclidian distance of the data-point representing the target contact could be identified as all corresponding to the same individual. In other example embodiments, machine learning techniques may be applied to generate a K-nearest neighbor clustering model for identifying data-points that correspond to the same individual contact. Such a model can, in some examples, be trained to apply relative weights to each of respective dimensional inputs. In some examples, models may be trained to perform qualitative to numerical mapping for the respective dimensions.

Accordingly, in example embodiments the filtering applied in block 508 may reduce a list of possible duplicate contacts to a smaller list of candidate duplicate contacts. By way of illustrative example, in the case of the possible duplicate contacts identified in FIG. 13A, as a result of filtering applied at block 508 two of the possible duplicate contacts (e.g., contacts identified by CRM IDs 4 and 5) are automatically eliminated, resulting in a duplicate contact list 530 that identifies the target contact (CRM ID 1) and two possible duplicate contacts (CRM IDs 2 and 3).

As illustrated in block 514, in example embodiments the duplicate contact list 530 is sent through communication network 150 to data steward module 118 for consideration and processing by data steward 400. In example embodiments, information from each of the respective contact records 108 may be included as part of the candidate duplicate contact list 530. In example embodiments where batch processing of duplicate contacts is performed, a master list that includes multiple target contacts their corresponding candidate duplicate contact list 530 may be provided to data steward module 118.

Figure 16:
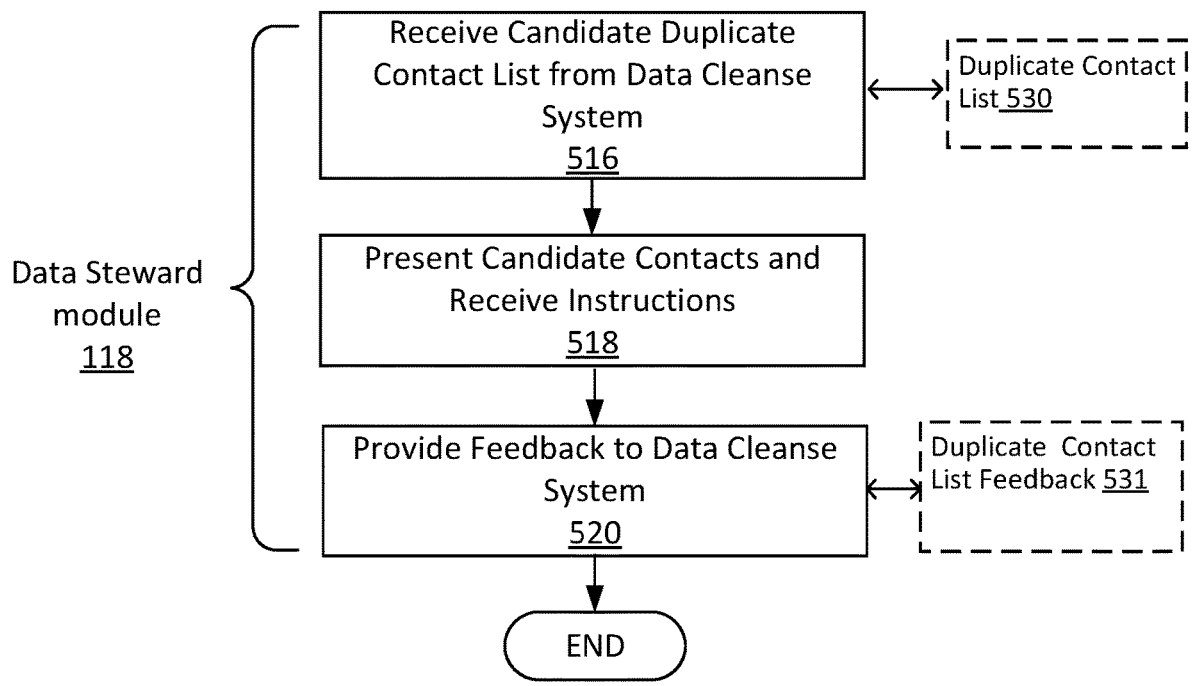
FIG. 16 is a flow chart illustrating operations that can be performed by the data steward module of a CRM support agent included in the client network of FIG. 1, according to example embodiments, to support detection and processing of duplicate contact data.

Referring to FIG. 16, as indicated in block 516, the data steward module 118 of CRM support agent 114 is configured to receive a copy of the duplicate contact list 530. In example embodiments, data steward module 118 is configured to present the target contact and the candidate duplicates identified in duplicate contact list 530 to data steward 400 for processing. Based on the input from the data steward 400, the data steward module 118 prepares duplicated contact list feedback 531 for sending to the data cleanse system 300. This feedback 531 may specify what contacts to merge into a single contact record 108, what contact data to include in merged contact record 108 and which contacts to remove as active contacts as a result of the merger.

Figure 17:
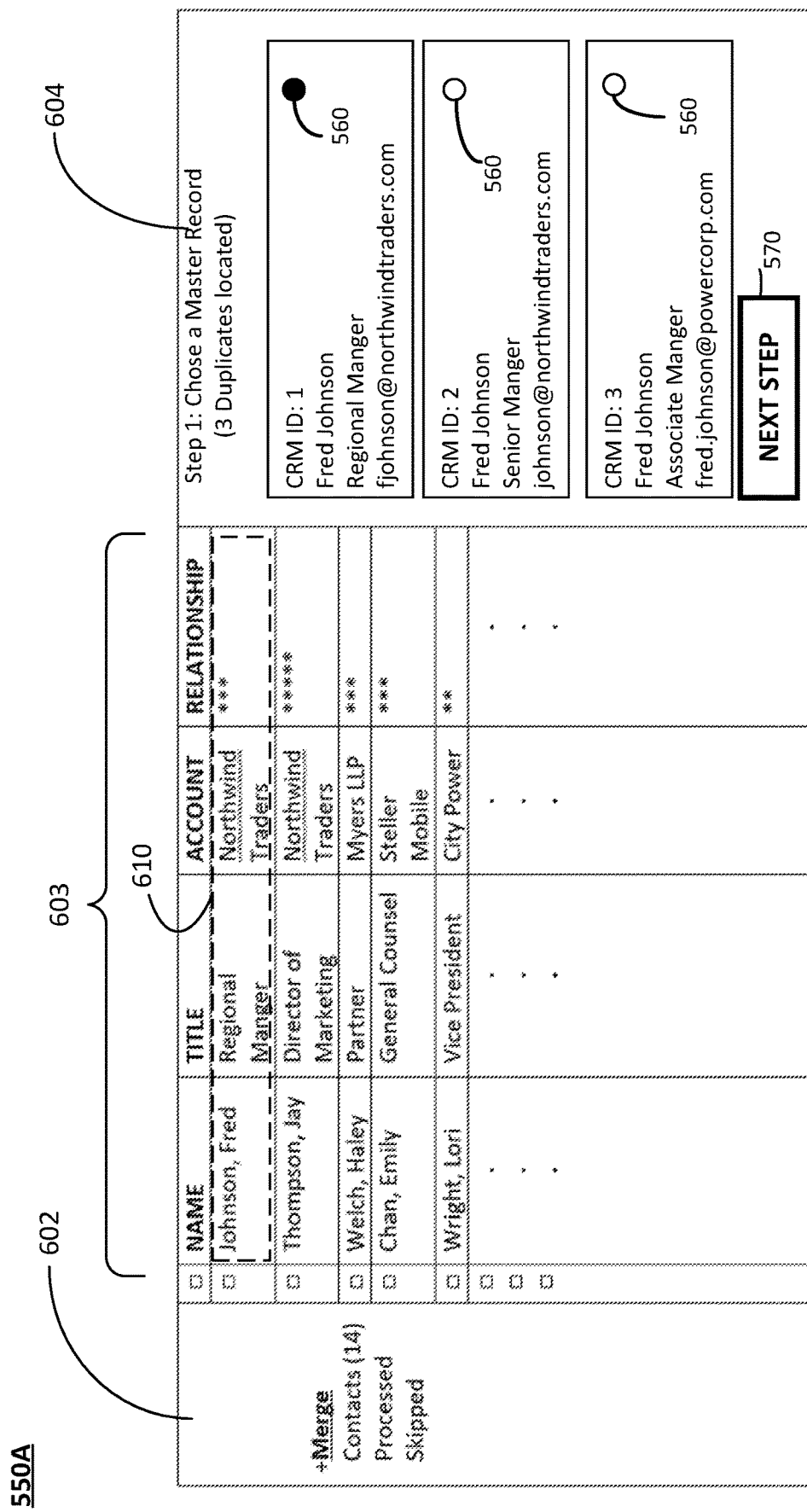

FIGS. 17 to 20 show a series of successive user interface displays 550A to 550D presented by data steward module 118 according to an illustrative example. Referring to FIG. 17, in example embodiments, data steward module 118 is configured to generate an interactive user interface display 550A for the data steward 400, using a display device. As illustrated, user interface display 550A may have a similar layout to user interface display 600 described above and includes three display regions, namely a task selection region 602 that allows the data steward 400 to select between different data cleaning task options, a contact record display region 603 that displays information for a plurality of target contacts in table form, and a contact processing region 604.

In the illustrated embodiment, the contact record display region 603 is configured to operate in a batch processing mode and in this regard displays information about multiple target contacts, each of which have an associated duplicate contact list 530. Contact record display region 603 can display information derived from the contact information known in respect of the target contacts (as noted above, contact information may in some cases be included as part of the duplicate contact list 530). In example embodiments, the "relationship" field may be a graphical representation of the TCV indicator for the target contact, if available.

In example embodiments, the data steward 400 can interact with the displayed information in the same manner as described above in respect of user interface display 600 to select and highlight a target contact, and cause resulting details about the target contact to appear in contact processing region 604.

In the illustrated example, data steward module 118 causes information about the duplicate contacts that correspond to the target contact selected in display region 603 (e.g., Johnson, Fred, as selected by on-screen indicator 610) to appear in the contact processing region 604. In particular, as shown in the illustrated example, contact processing region 604 indicates "3 Duplicates Located" (i.e., the target contact and the two candidate duplicate contacts) and includes summary contact information section for each of the three contacts that displays information derived from the respective contact records 108. In example embodiments, the data steward module 118 will display more information in respect of each of the duplicate contacts displayed in the region 604 upon detecting user selection of the section displaying the summary information. As indicated in FIG. 17, in an example embodiment each of the respective duplicate contacts can be individually selected as the "Master Record" by data steward 400 selecting an associated on-screen selection indicator 560. In the illustrated example, the indicator 560 associated with the contact record that corresponds to CRM ID 1 is selected to indicate which contact and associated contact record will act as the "Master Record".

Figure 18:
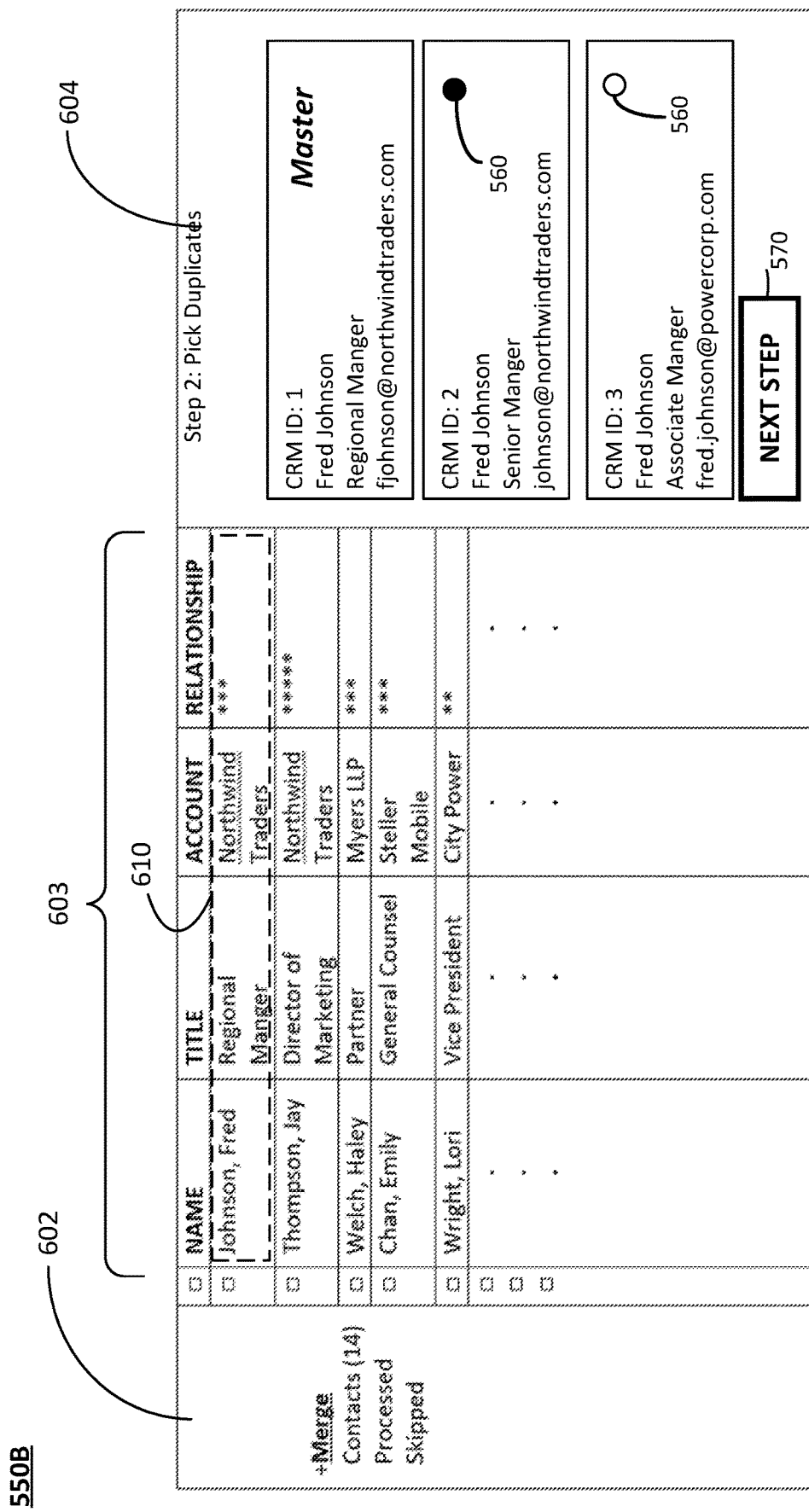

In example embodiments selection of a "Next Step" option 570 will causes the data steward module 118 to display a "Pick Duplicates" interface in contact processing region 604, as shown in the user interface display 550B of FIG. 18. As shown in FIG. 18, Data steward 400 can select, using on-screen selection indicators 560, which of the duplicate candidate records should be merged with the previously selected "Master" Record. In the illustrated example, the data steward 400 decides that the "Fred Johnson" associated with CRM ID 2 is the same individual as the "Fred Johnson" that is associated with CRM ID 1, but that the "Fred Johnson" associated with CRM ID 3 is not. Accordingly, the data steward 400 selects only the on-screen selection indicator 560 (shown as a solid circle) for the "Fred Johnson" contact record associated with CRM ID 2 as a duplicate. When the data steward 400 then selects the "Next Step" option 570, the data steward module 118 will record that the client record associated with CRM ID 2 and the client record associated with CRM ID 1 are duplicate records, and proceed to the user interface display 550C as shown in FIG. 19.

Figure 19:
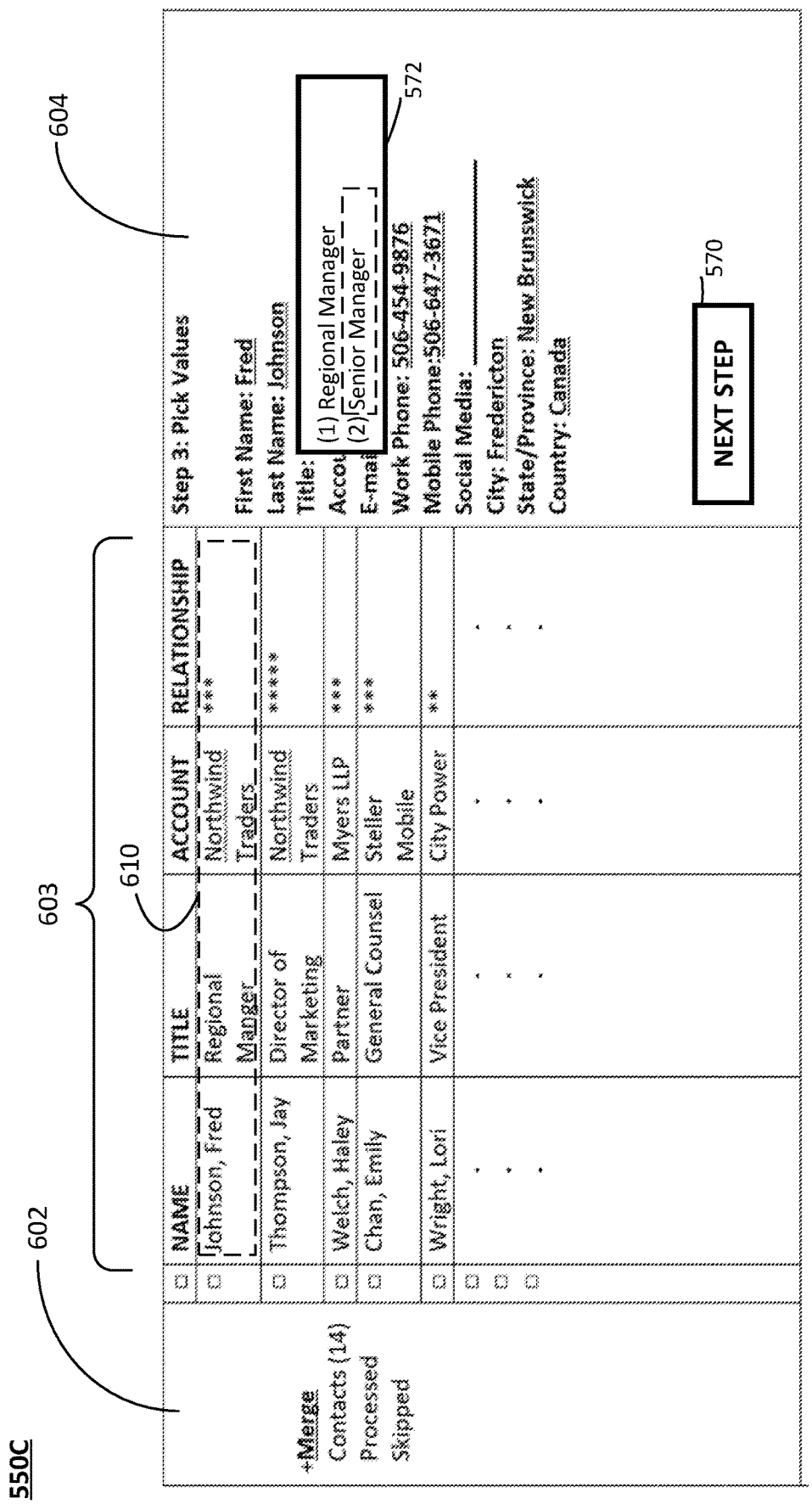

In FIG. 19, the contact processing region 604 displays a set of user-editable fields that correspond to at least some of the fields of contact data record 108. The fields are automatically pre-populated with contact information that corresponds to the information known for the contact selected as the "Master" contact (e.g., the contact and contact information associated with CRM ID 1 in the present example). In an example embodiment, data steward module 118 is configured to display a drop-down box 572 for a particular user contact field in response to a predetermined input by a user (e.g., the data steward 400) selecting that field. The data steward module 118 is configured to populate the drop-down box 572 with the data options taken from the corresponding fields of the master and selected duplicate contact records. If the data steward module 118 detects user input selecting a data option for a field that is different that the information currently contained in that field in the master contact record, the data steward module 118 will update the master contact record field accordingly. For example, in FIG. 19, data steward 400 is presented with the title option "Regional Manager" corresponding to the title field associated with the "Master" contact, and the title option "Senior Manager" corresponding to the title field associated with the "duplicate" contact (e.g., the contact and contact information associated with CRM ID 1 in the present example). The data steward 400 can second option to indicate that the title "Senior Manager" is to be used instead of "Regional Manger" in the title filed of the merger contact record. When the data steward 400 then selects the "Next Step" option 570, the data steward module 118 will record the instructed changes to update the master record information accordingly, and proceed to the user interface display 550D as shown in FIG. 20.

The contact processing region 604 of user interface display 550D is configured to allow the data steward 400 to review, and if desired manually modify, the contact information that will be used for the merged contact record. When the data steward module 118 detects user selection of a "Merge" option 576 presented on user interface display 550D the data steward module 118 finalizes the information required to merge and update the master contact file and includes this information in duplicate contact list feedback 531.

As indicated in block 520 of FIG. 16, data steward module 118 sends the duplicate contact list feedback to data cleanse system 300. In some examples, this feedback could be provided individually for each target contact its respective duplicate contact list 530 or could be done on a batch basis for multiple target contacts and duplicate contact lists 530.

Referring again to FIG. 14, as indicated in block 540, data cleanse system 300 receives the duplicate contact list feedback 531 in respect of the duplicate contact list 530 it previously generated. As indicated in block 542, data cleanse system 300 communicates with CRM system 200 to cause the appropriate updates to CRM database 170. For example, the CRM contact record 178 corresponding to the record identified as the master record can be amended to update any contact information that was changed or added. In the event that the record identified as the master record was not already in the CRM database 170, a new contact can be registered and a new contact record 178 created. Any contacts/contact records 178 that correspond to contacts/contact records identified as duplicate contacts can be removed from CRM database 170 or otherwise flagged as duplicated. As indicated in block 544, data cleanse system 300 perform the same updates in respect of the contacts/contact records 108 stored in relationship data storage 100.

Accordingly, in an example embodiment, CRM support agent 114 and data cleanse system 300 of CRM support System 120 are configured to assist with identification, merger and modification of duplicate contact records in CRM system 200 and relationship data storage 100. This process is largely automated such that information is collected and assembled automatically and then presented to the data steward 400 in a user friendly efficient manner. With minimal effort, the data steward 400 can flag indicate what contact records should be merged and the data that should be included in the merged records. CRM system 200 and relationship storage data 100 are then automatically updated based on the data steward input.

Overview and Alternative Configurations

As will be appreciated from the above description, in example embodiments, the data cleanse system 300 implements a computer implemented method for updating customer data that includes a plurality of electronically stored contact records 108, 178 that each include contact information for a respective individual contact 192. Data cleanse system 300 applies automated filtering to the customer data to identify contacts that fall within defined filtering criteria. The data cleanse system 300 then provides contact information about the identified contacts to a decision making authority for a further layer of filtering (e.g. data steward 400 via data steward module 118). The data cleanse system 300 receives feedback derived from the decision making authority in respect of the provided contact information, and based on the feedback, automatically updates the customer data.

In various embodiments, the defined filtering criteria may be rules based and/or based on machine learned models. In example embodiments, the defined filtering criteria are selected to: (i) identify individual contacts for potential archiving; (ii) identify individual contacts for potential removal based on a predetermined privacy policy; (iii) identify duplicate contact records that potentially all correspond to a same individual based on a similarity of contact information included in the contact records; and or (iv) identify individual contacts that are potential new active contacts.

In at least some examples, the described systems and methods can improve the efficiency and accuracy of data cleansing, thereby enabling one or more of the CRM system computing devices that make up the CRM support system 120, CRM system 200 and enterprise network 110 to expend fewer computing resources, consume less power and/or require fewer data and power consuming human interactions than might otherwise be required to achieve similar results in the absence of the disclosed systems and methods.

In the illustrated embodiment, data steward module 188 is hosted at enterprise network 110, and CRM support system 120 and CRM system 200 are remotely hosted outside of the enterprise network. In different embodiments, features and systems preformed at one system can be moved to a different system. For example, in alternative example embodiments, one or both of CRM support system 120 and CRM system 200 may be moved in their entirety to within the enterprise network 110. In a further alternative embodiment, some or all of the functionality of data cleanse system 300 could be moved to enterprise network 110 and integrated with data steward module 118. In some examples, functionality of data steward module 118 could be integrated into data cleanse system 300 of CRM support system and the data steward 400 provided with a web interface to access such functionality. In some example embodiments, some or all of the functionality of CRM system 100 and CRM support system 120 may be merged into a single system.

In the examples described above, the decision making authority that interfaces with data steward module 118 has been described as a data steward 400 that is a human. However, in some embodiments a machine learning based system may be trained to perform such decision making functions.

Contact records 108 and 178 can be electronically stored in various database formats in different embodiments. In some examples, the records may be stored as part of relational database. In some examples a customer record may be a virtual record that identifies or links to other data sources for the actual content of the data field of that record. In some cases, data fields of a record may include sub-records comprising multiple fields or links to such sub-records.

Example Computer System

In example embodiments, the components, modules, systems and agents included in enterprise network 110, CRM support system 120 and CRM system 200 can be implemented using one or more computer devices, servers or systems that each include a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a digital signal processor, or another hardware processing circuit.

Figure 21:
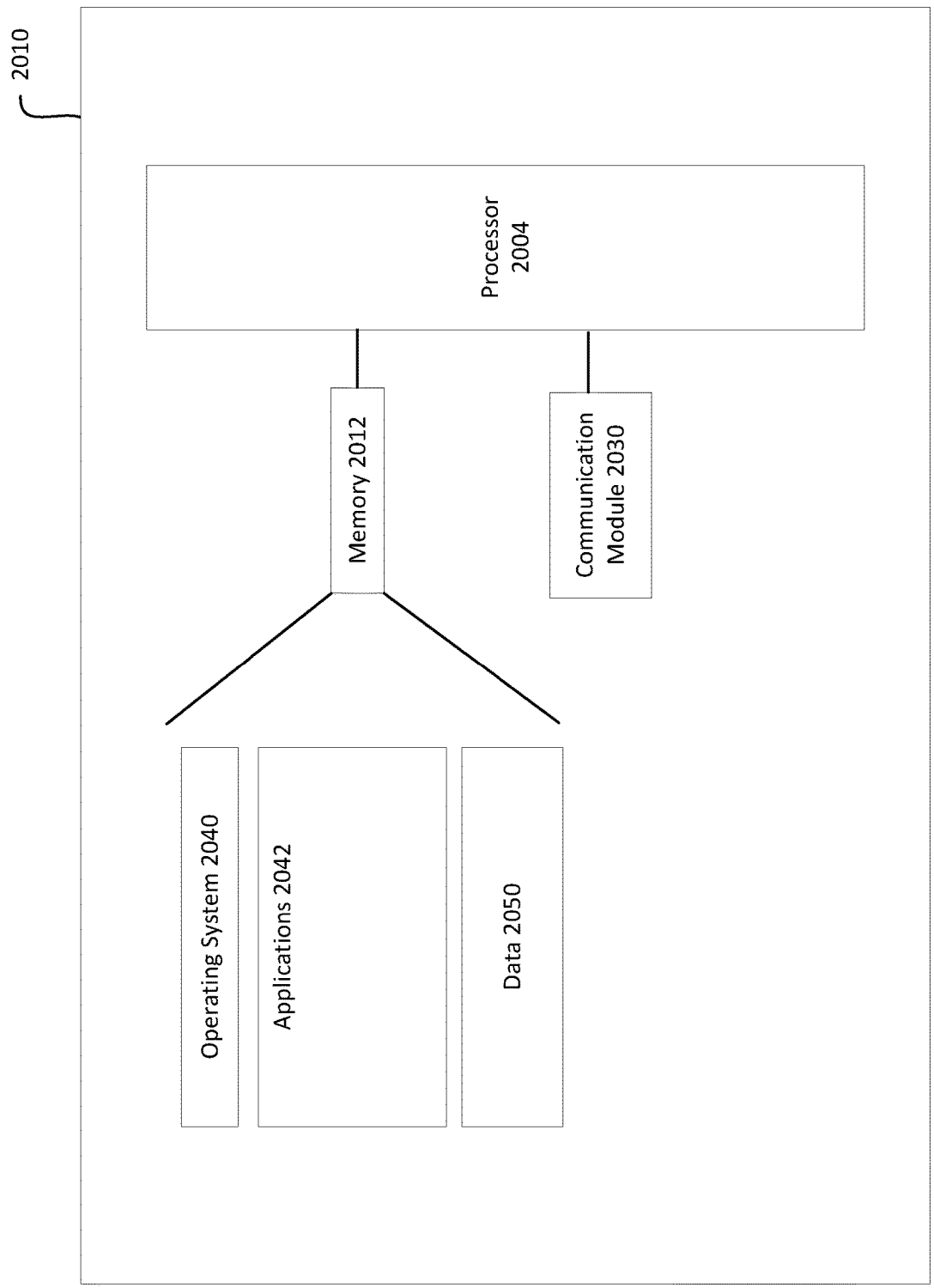
FIG. 21 is a simplified block diagram illustrating an example computer system for implementing one or more of the systems, modules and components shown in the environment of FIG. 1.

Referring to FIG. 21, an example embodiment of a computer system 2010 for implementing one or more of the modules, systems and agents included in enterprise network 110, CRM support system 120 and CRM system 200 will be described. In example embodiments, computer system 2010 may be a computer server. The system 2010 comprises at least one processor 2004 which controls the overall operation of the system 2010. The processor 2004 is coupled to a plurality of components via a communication bus (not shown) which provides a communication path between the components and the processor 204. The system comprises memories 2012 that can include Random Access Memory (RAM), Read Only Memory (ROM), a persistent (non-volatile) memory which may one or more of a magnetic hard drive, flash erasable programmable read only memory (EPROM) ("flash memory") or other suitable form of memory. The system 2010 includes a communication module 2030.

The communication module 2030 may comprise any combination of a long-range wireless communication module, a short-range wireless communication module, or a wired communication module (e.g., Ethernet or the like) to facilitate communication through communication network 150.

Operating system software 2040 executed by the processor 2004 may be stored in the persistent memory of memories 2012. A number of applications 2042 executed by the processor 2004 are also stored in the persistent memory. The applications 2042 can include software instructions for implementing the systems, methods, agents and modules described above.

The system 2010 is configured to store data that may include CRM contact records (in the case of CRM system 200) and customer data 102 (in the case of CRM support system 120).

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer implemented method for updating customer data that includes a plurality of electronically stored contact records that each include contact information for a respective individual contact, comprising:
   applying automated filtering to the customer data to identify one or more duplicate contacts that fall within defined filtering criteria, wherein the defined filtering criteria include similarities in separate individual contact data found in multiple contact records, and the similarities are identified through logic based comparison algorithms;
   generating a multi-dimensional feature vector representing each identified duplicate contact;
   performing cluster analysis on the resulting feature vectors to reduce the identified duplicate contacts to a smaller candidate list of one or more identified duplicate contacts;
   providing information about the duplicate contacts included in the smaller candidate list to a decision making authority for additional filtering; and
   receiving feedback derived from the decision making authority in respect of the provided information, and based on the feedback, automatically updating the customer data in respect of the duplicate contacts included in the smaller candidate list.

2. The method of claim 1 wherein the electronically stored contact records include, for at least some of the individual contacts, a first contact record maintained by a customer relationship management (CRM) system, and a second contact record maintained by a CRM support system, the contact record and the second contact record for an individual contact being linked by a unique contact ID, wherein:
   applying the automated filtering to the customer data comprises applying the defined filtering criteria to contact information at least partially derived from the second contact records; and
   automatically updating the customer data comprises causing the CRM support system to update the second contact records and causing the CRM system to update the first contact records.

3. The method of claim 1 wherein the defined filtering criteria are selected to identify individual contacts that are potential active contacts, the method comprising, for each of a plurality of potential new contacts:
   receiving information identifying the potential new contact;
   determining a completeness indicator for the potential new contact that quantifies a completeness of contact information available for the potential new contact;
   determining a contact relationship value indicator for the potential new contact that quantifies a perceived value of the potential new contact;
   wherein the filtering criteria is applied to the completeness indicator and the contact relationship value indicator determined in respect of each of the plurality of potential new contacts, and the information provided to the decision making authority includes the potential new contacts identified as potential active clients;
   wherein the feedback identifies the potential active clients that are to be included in the customer data as active contacts.

4. The method of claim 3 wherein automatically updating the customer data comprises, for each potential contact identified in the feedback for inclusion as an active contact:
   adding a new contact record for any contact that does not have an existing contact record;
   merging non-overlapping individual contact data from one or more contacts found in filtered contact records identified by the data steward module as duplicate contact records into the identified master contact record;
   deleting one or more contact records identified by the data steward module as duplicate contact records of the identified master contact record; and
   including an indicator in the customer data to indicate that the contact is an active contact.

5. The method of claim 3 wherein the contact relationship value indicator for each potential new contact is determined based on combination of: (i) a perceived value of an existing relationship with the contact's organization, and (ii) the potential new contacts position within the contact's organization; and wherein the contact relationship value indicator is included in the information provided to the decision making authority.

6. The method of claim 1 wherein the contact information for a respective individual contact includes a relationship strength information that quantifies communication interaction history with the individual contact, wherein the defined filtering criteria is based on the relationship strength information.

7. The method of claim 6 wherein the contact information for a respective individual contact includes a total contact value indicator that quantifies a perceived overall value of the respective contact based on: a position of the individual contact within the contact's organization; a size of the contact's organization; and the relationship strength information,
   wherein the defined filtering criteria is based on the total contact value indicator.

8. The method of claim 1 wherein the defined filtering criteria are selected to identify individual contacts for potential archiving based on contact information included in the contact records for the respective individual contacts, the defined filtering criteria being based on a recentness of communication interaction with individual contacts determined based on the contact information.

9. The method of claim 1 wherein the defined filtering criteria are selected to identify one or more possible duplicate contact records that potentially all correspond to a same individual based on a similarity of contact information included in the contact records.

10. The method of claim 1 wherein:
    the individual contact data includes one or more of the following contact data fields for a respective contact: first name, last name, title, organization, e-mail address, phone number, and social media link, and wherein the multi-dimensional feature vector representing each identified duplicate contact includes incudes respective numeric values derived from a respective plurality of the contact data fields for the respective contact.

11. The method of claim 10 wherein automatically updating the customer data comprises:
    updating one or more of the fields of the individual contact data in one of the multiple contact records with data included in one or more corresponding fields of another one of the multiple contact records.

12. The method of claim 10 wherein automatically updating the customer data comprises:
merging non-overlapping individual contact data from one or more of the multiple contacts records act records into a master contact record.

13. The method of claim 1 wherein providing information about the duplicate contacts included in the smaller candidate list to the decision making authority comprises:
causing a user interface to simultaneously display information about the duplicate contacts in adjacent display areas of a user interface screen to enable a visible comparison of contact data from identical data fields for the duplicate contacts.

14. A computer system for updating customer data that includes a plurality of electronically stored contact records that each include contact information for a respective individual contact, the computer system comprising:
a processor;
a non-volatile storage coupled to the processor and including software instructions that when executed by the processor configure the computer system to:
apply automated filtering to the customer data to identify one or more duplicate contacts that fall within defined filtering criteria, wherein the defined filtering criteria include similarities in separate individual contact data found in multiple contact records, and the similarities are identified through logic based comparison algorithms;
generate a multi-dimensional feature vector representing each identified duplicate contact;
perform cluster analysis on the resulting feature vectors to reduce the identified duplicate contacts to a smaller candidate list of one or more identified duplicate contacts;
provide information about the duplicate contacts included in the smaller candidate list to a decision making authority for additional filtering; and
receive feedback derived from the decision making authority in respect of the provided information, and based on the feedback, automatically update the customer data in respect of the duplicate contacts included in the smaller candidate list.

15. The system of claim 14 wherein the electronically stored contact records include, for at least some of the individual contacts, a first contact record maintained by a customer relationship management (CRM) system, and a second contact record maintained by a CRM support system, the contact record and the second contact record for an individual contact be linked by a unique contact ID,
wherein:
the computer system is configured to:
apply the automated filtering to the customer data by applying the defined filtering criteria to contact information at least partially derived from the second contact records; and
automatically update the customer data by causing the CRM support system to update the second contact records and causing the CRM system to update the first contact records.

16. The system of claim 15 wherein the contact information for a respective individual contact includes a relationship strength information that quantifies communication interaction history with the individual contact, wherein the defined filtering criteria is based on the relationship strength information.

17. The system of claim 15 wherein the defined filtering criteria are selected to: (i) identify individual contacts for potential archiving; (ii) identify individual contacts for potential removal based on a predetermined privacy policy; and/or (iii) identify one or more duplicate contact records that potentially all correspond to a same individual based on a similarity of contact information included in the contact records.

18. The system of claim 14 wherein the defined filtering criteria are selected to identify individual contacts that are potential active contacts,
wherein the system is configured to, for each of a plurality of potential new contacts:
receive information identifying the potential new contact;
determine a completeness indicator for the potential new contact that quantifies a completeness of contact information available for the potential new contact;
determine a contact relationship value indicator for the potential new contact that quantifies a perceived value of the potential new contact;
wherein the filtering criteria is applied to the completeness indicator and the contact relationship value indicator determined in respect of each of the plurality of potential new contacts, and the information provided to the decision making authority includes the potential new contacts identified as potential active clients;
wherein the feedback identifies the potential active clients that are to be included in the customer data as active contacts.

* * * * *